(12) United States Patent
Aoi

(10) Patent No.: US 10,732,392 B2
(45) Date of Patent: Aug. 4, 2020

(54) ZOOM LENS AND IMAGING APPARATUS

(71) Applicant: FUJIFILM Corporation, Tokyo (JP)

(72) Inventor: Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 398 days.

(21) Appl. No.: 15/857,793

(22) Filed: Dec. 29, 2017

(65) Prior Publication Data

US 2018/0259752 A1 Sep. 13, 2018

(30) Foreign Application Priority Data

Mar. 7, 2017 (JP) ................. 2017-043050

(51) Int. Cl.

| | |
|---|---|
| *G02B 15/14* | (2006.01) |
| *G02B 15/173* | (2006.01) |
| *G08B 13/196* | (2006.01) |
| *G02B 13/00* | (2006.01) |
| *G02B 27/64* | (2006.01) |
| *H04N 5/232* | (2006.01) |

(52) U.S. Cl.
CPC ......... *G02B 15/173* (2013.01); *G02B 13/004* (2013.01); *G02B 27/646* (2013.01); *G08B 13/1963* (2013.01); *G08B 13/19619* (2013.01); *G08B 13/19632* (2013.01); *H04N 5/23296* (2013.01)

(58) Field of Classification Search
CPC .. G02B 13/009; G02B 13/004; G02B 13/006; G02B 15/155; G02B 15/173; G02B 27/646; G08B 13/19619; G08B 13/1963; G08B 13/19632; H04N 5/23296
USPC .......................... 359/676–682, 684, 686, 687
See application file for complete search history.

(56) References Cited

U.S. PATENT DOCUMENTS

| | | |
|---|---|---|
| 5,737,128 A | 4/1998 | Usui |
| 6,989,942 B1 | 1/2006 | Nurishi |
| 8,254,036 B2 * | 8/2012 | Aoi .................. G02B 27/646 |
| | | 359/687 |

(Continued)

FOREIGN PATENT DOCUMENTS

| | | |
|---|---|---|
| JP | H09-005628 A | 1/1997 |
| JP | 2001-100099 A | 4/2001 |

(Continued)

OTHER PUBLICATIONS

An Office Action mailed by the Japanese Patent Office dated Jan. 7, 2020, which corresponds to Japanese Patent Application No. 2017-043050 and is related to U.S. Appl. No. 15/857,793.

*Primary Examiner* — Travis S Fissel
(74) *Attorney, Agent, or Firm* — Studebaker & Brackett PC

(57) ABSTRACT

The zoom lens includes, in order from the object side, a first lens group that has a positive refractive power, a second lens group that has a negative refractive power, a third lens group that has a positive refractive power, a fourth lens group that has a positive refractive power and has a stop disposed to be closest to the object side. During zooming, the second lens group and the third lens group move, and the other lens groups remain stationary. The first lens group consists of, in order from the object side, two groups of cemented lenses in which a negative meniscus lens and a positive lens are cemented, and a cemented lens in which a positive lens and a negative lens are cemented. During focusing, only the cemented lens closest to the image side in the first lens group moves.

11 Claims, 11 Drawing Sheets

EXAMPLE 1

(56) References Cited

U.S. PATENT DOCUMENTS

| | | | |
|---|---|---|---|
| 2008/0037136 A1 | 2/2008 | Tsutsumi et al. | |
| 2012/0026604 A1 | 2/2012 | Aoi | |
| 2013/0271850 A1* | 10/2013 | Shimomura | G02B 15/14 |
| | | | 359/687 |

FOREIGN PATENT DOCUMENTS

| | | | |
|---|---|---|---|
| JP | 2007-078333 | A | 3/2007 |
| JP | 2008-040395 | A | 2/2008 |
| JP | 2012-032469 | A | 2/2012 |
| JP | 5438620 | B2 | 3/2014 |

\* cited by examiner

FIG. 2
EXAMPLE 1
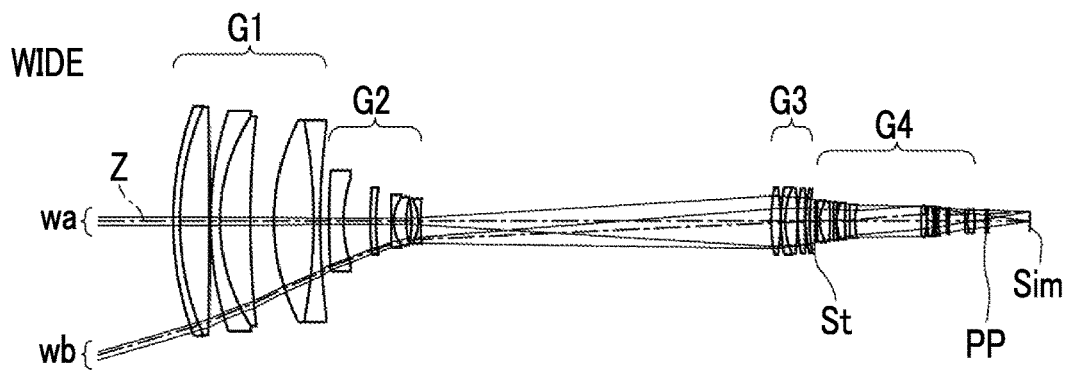
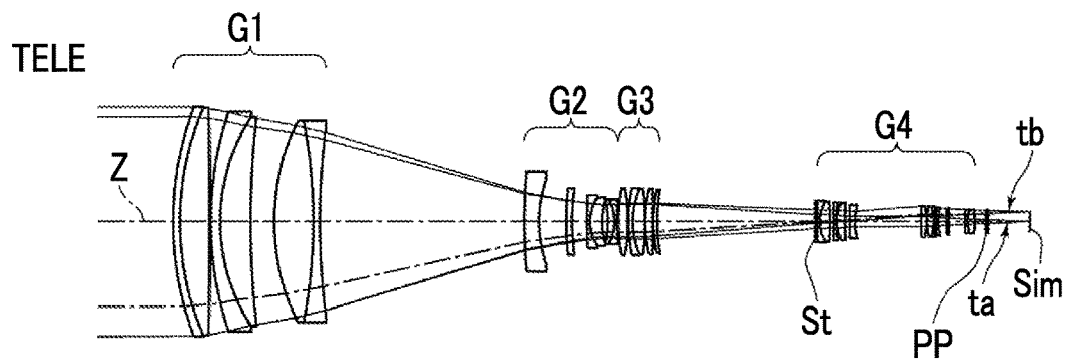
FIG. 3
EXAMPLE 1
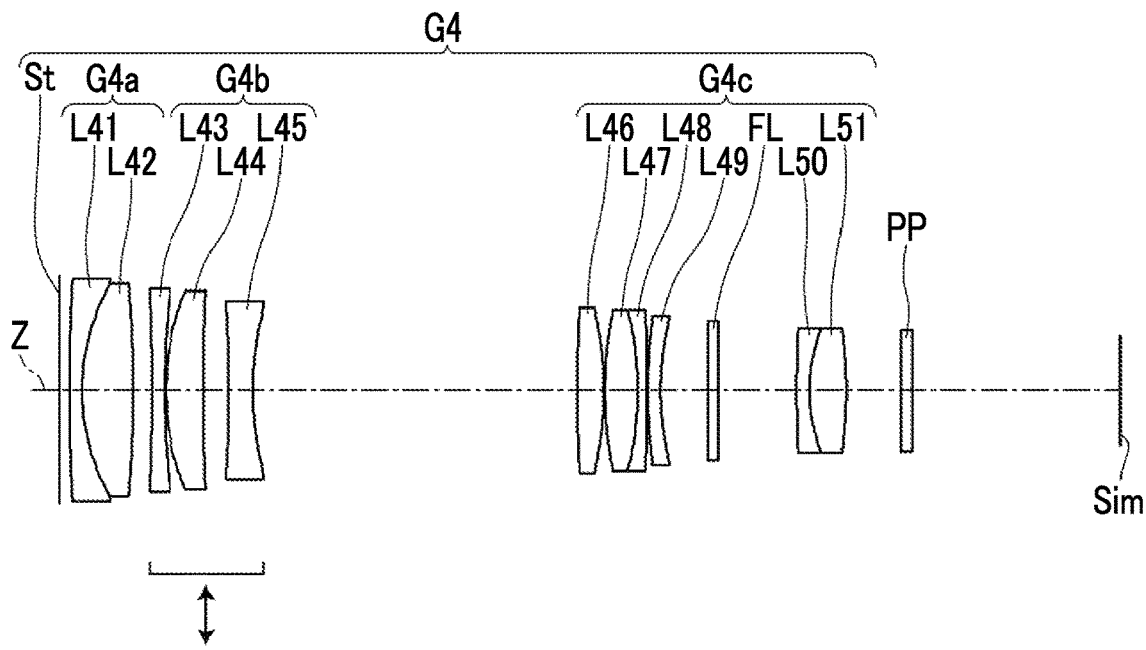

EXAMPLE 1 AFTER INSERTION OF EXTENDER LENS GROUP

EXAMPLE 2

EXAMPLE 2 AFTER INSERTION OF EXTENDER LENS GROUP

EXAMPLE 3

EXAMPLE 3 AFTER INSERTION OF EXTENDER LENS GROUP

EXAMPLE 3

EXAMPLE 4 AFTER INSERTION OF EXTENDER LENS GROUP

FIG. 11
EXAMPLE 1
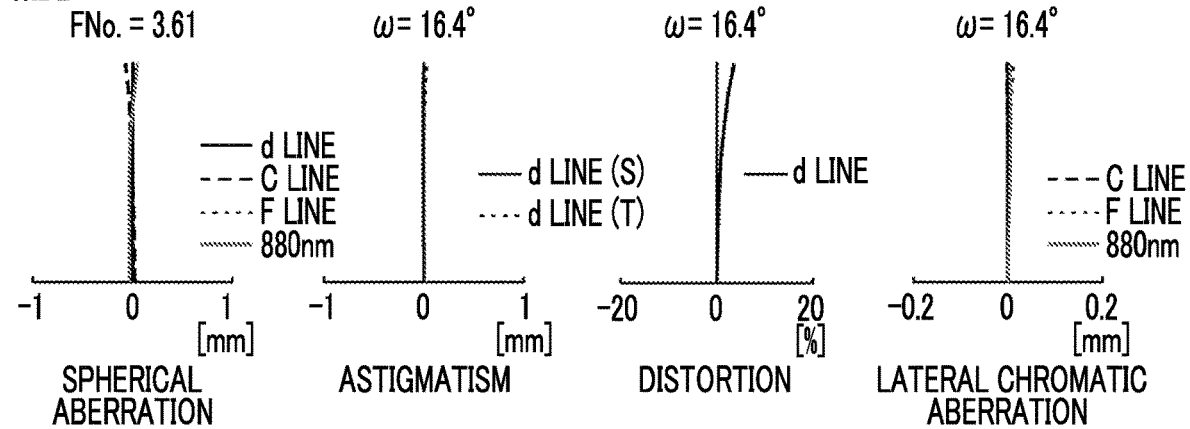
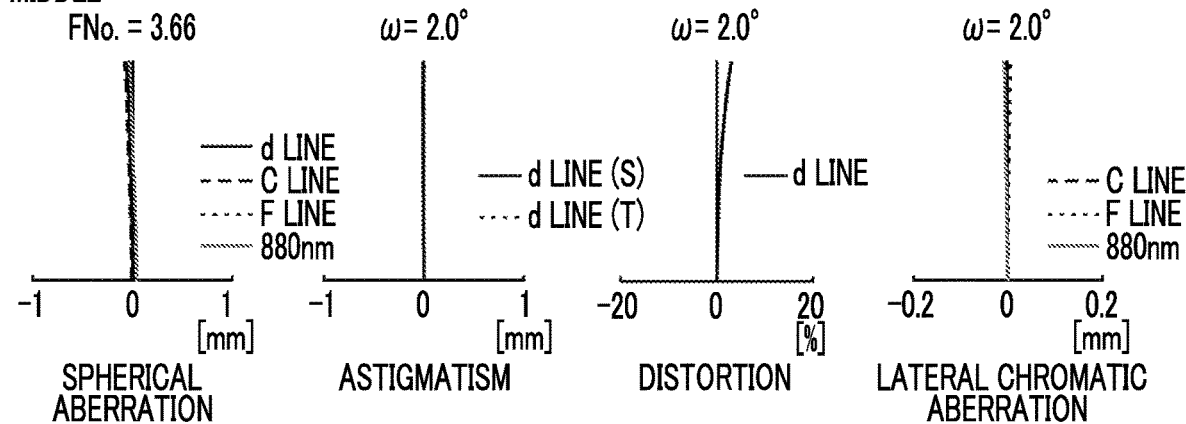
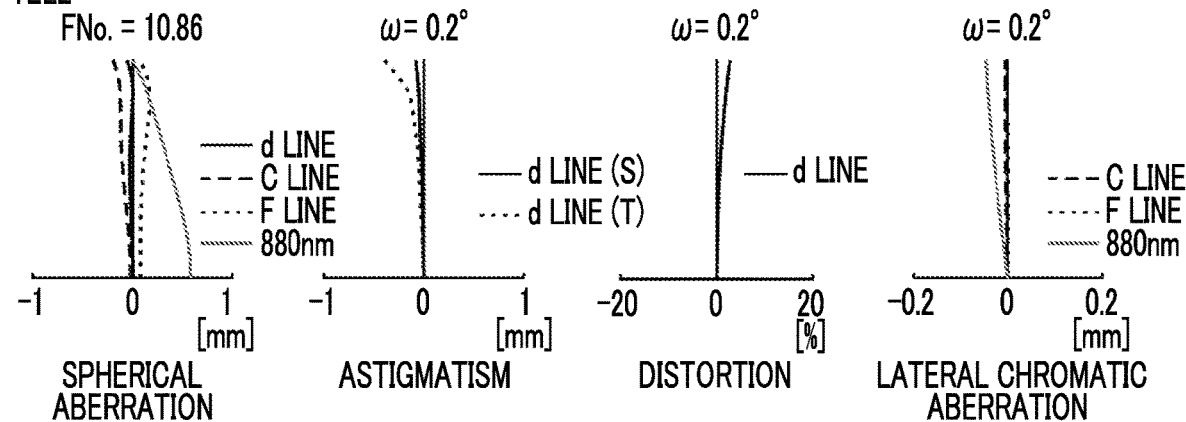

FIG. 12
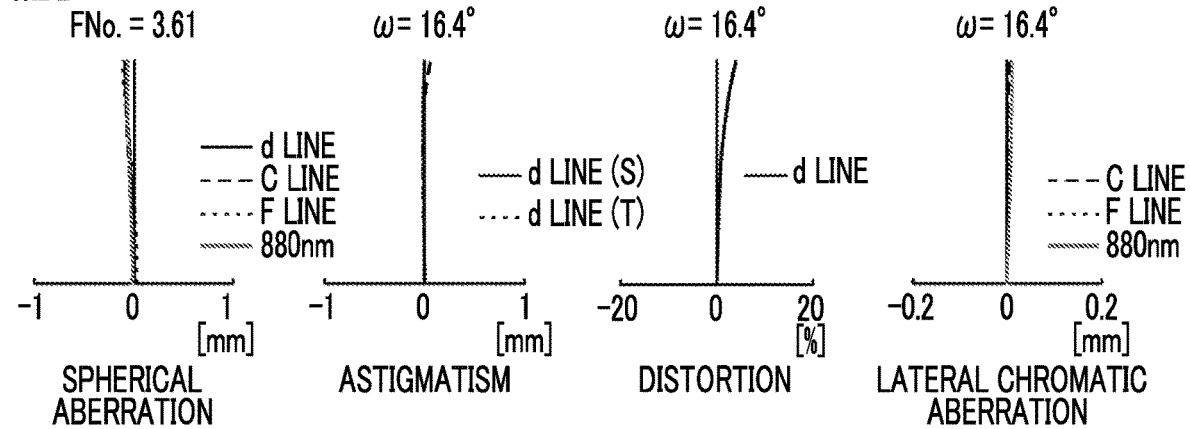
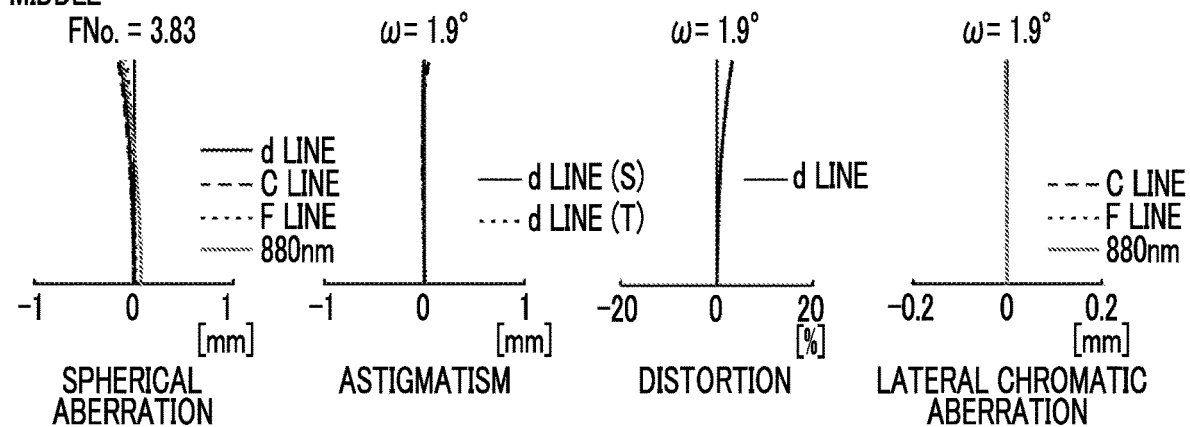
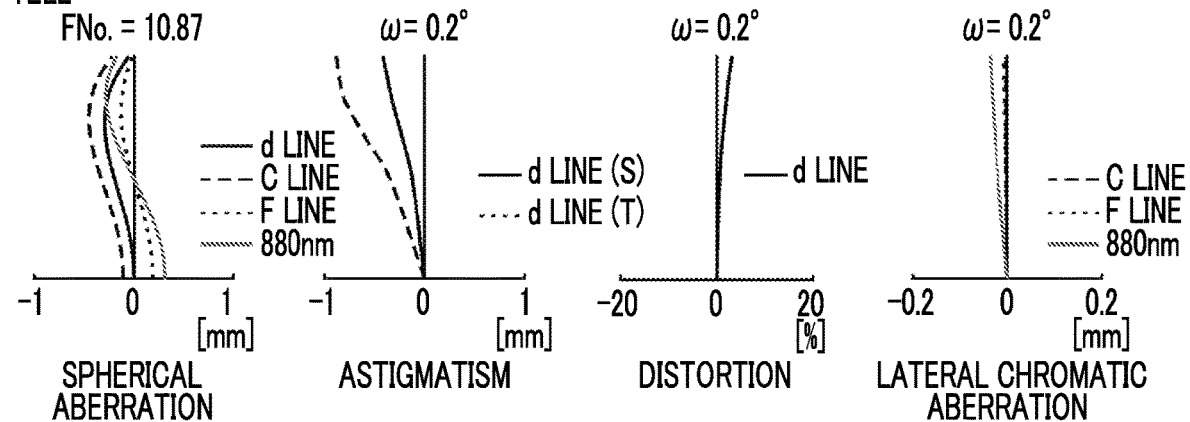

ZOOM LENS AND IMAGING APPARATUS

CROSS-REFERENCE TO RELATED APPLICATIONS

The present application claims priority under 35 U.S.C. § 119 to Japanese Patent Application No. 2017-043050, filed on Mar. 7, 2017. The above application is hereby expressly incorporated by reference, in its entirety, into the present application.

BACKGROUND OF THE INVENTION

1. Field of the Invention

The present invention relates to a zoom lens and an imaging apparatus. In particular, the present invention relates to a zoom lens, which is appropriate for a long-distance surveillance camera, and an imaging apparatus comprising the zoom lens.

2. Description of the Related Art

In the related art, zoom lenses having a high zoom ratio are used as an optical system for surveillance cameras used for remote monitoring in harbors, airports, and the like. As a zoom lens suitable for such application, for example, a zoom lens described in Japanese patent No. 5438620 is known. Japanese patent No. 5438620 discloses a zoom lens comprising, in order from the object side, the following four lens groups: a first lens group having a positive refractive power and including a cemented lens; a second lens group having a negative refractive power; a third lens group having a positive refractive power; and a fourth lens group having a positive refractive power. With such a configuration, among the lens groups, by moving the second lens group and third lens group, a zoom ratio of 60 times is achieved.

SUMMARY OF THE INVENTION

In recent years, a zoom lens for application in distance monitoring is required to have high performance so as to cope with an increase in number of pixels of an imaging element while having a high zoom ratio capable of zooming up to a long focal length. In the above-mentioned application, in order to perform imaging even at nighttime or in a dense fog, there is a demand for a zoom lens compatible with not only the visible region but also the near infrared wavelength region.

The zoom lens described in Japanese patent No. 5438620 realizes a high zoom ratio and high performance. However, in a case where it is attempted to respond to the demand for a higher zoom ratio in recent years, that is, a long focal length at the telephoto end, aberration correction, especially correction of chromatic aberration at the telephoto end becomes problematic. Specifically, in order to remove the residual 2nd-order spectrum, the absolute value of the radius of curvature of each cemented surface of the cemented lens of the first lens group is set to be smaller. Therefore, a difference in spherical aberration for each wavelength is generated, and thus it becomes difficult to sufficiently correct chromatic aberration. In order to further increase the magnification thereof, it is necessary to prevent the absolute value of the radius of curvature of the cemented surface from becoming excessively small and to reduce the difference in spherical aberration for each wavelength.

In such a manner, it is difficult to realize an optical system that has favorable performance throughout the entire zooming range while realizing a high zoom ratio, and that is compatible with visible to near-infrared wavelength bands. In order to satisfy these demands at the same time, the optical system tends to become larger, but in recent years, the demand for compactness of the apparatus has become stronger.

The present invention has been made in consideration of the above-mentioned situations, and it is an object of the present invention to provide a zoom lens, which is compatible with visible to near-infrared wavelength bands and is capable of achieving both a high zoom ratio and high performance while suppressing an increase in size of the lens system, and an imaging apparatus comprising the zoom lens.

A zoom lens of the present invention comprises, in order from an object side: a first lens group that has a positive refractive power; a second lens group that has a negative refractive power; a third lens group that has a positive refractive power; and a fourth lens group that has a positive refractive power and has a stop disposed to be closest to the object side. During zooming from the wide-angle end to the telephoto end, the first lens group and the fourth lens group remain stationary with respect to an image plane, the second lens group and the third lens group move in a direction of an optical axis by changing a relative distance therebetween, and the second lens group and the third lens group simultaneously pass points at which respective lateral magnifications thereof are −1 times. The first lens group consists of, in order from the object side, a first cemented lens that is formed by cementing a negative meniscus lens and a positive lens in order from the object side, a second cemented lens that is formed by cementing a negative meniscus lens and a positive lens in order from the object side, and a third cemented lens that is formed by cementing a positive lens and a negative lens in order from the object side. In addition, during focusing from an object at infinity to a close-range object, only the third cemented lens moves.

In the zoom lens of the present invention, assuming that a focal length of the second lens group is f2 and a focal length of the whole system at the telephoto end during focusing on the object at infinity is ft, it is preferable that Conditional Expression (1) is satisfied, and it is more preferable that Conditional Expression (1-1) is satisfied.

$$-0.019 < f2/ft < -0.008 \quad (1)$$

$$-0.017 < f2/ft < -0.01 \quad (1\text{-}1)$$

In the zoom lens of the present invention, assuming that an average value of Abbe numbers of all the positive lenses in the first lens group at a d line is νavep and an average value of Abbe numbers of all the negative lenses in the first lens group at the d line is νaven, it is preferable that Conditional Expression (2) is satisfied, and it is more preferable that Conditional Expression (2-1) is satisfied.

$$24 < \nu_{avep} - \nu_{aven} < 41 \quad (2)$$

$$27 < \nu_{avep} - \nu_{aven} < 38 \quad (2\text{-}1)$$

In the zoom lens of the present invention, the fourth lens group comprises a fourth-a lens group that has a negative refractive power and includes one negative lens and one positive lens, a fourth-b lens group that has a negative refractive power and is disposed on the image side of the fourth-a lens group, and a fourth-c lens group that has a positive refractive power and is disposed on the image side of the fourth-b lens group so as to be separated from the fourth-b lens group by an air gap which is longest on the optical axis in the fourth lens group. Blurring in a captured image is corrected by moving only the fourth-b lens group in a direction perpendicular to the optical axis. Assuming that a focal length of the fourth-a lens group is f4a and a focal length of the fourth-b lens group is f4b, it is preferable that Conditional Expression (3) is satisfied, and it is more preferable that Conditional Expression (3-1) is satisfied.

$$2.4 < f4a/f4b < 6.6 \quad (3)$$

$$2.8 < f4a/f4b < 6.2 \quad (3\text{-}1)$$

In a case of adopting the preferred configuration of the fourth lens group, it is preferable that an extender lens group is detachably disposed to change a focal length of the whole system to a long focal length by being inserted in the optical path between the fourth-b lens group and the fourth-c lens group.

In the zoom lens of the present invention, assuming that a refractive index of the positive lens of the third cemented lens at a d line is Ndp, a refractive index of the negative lens of the third cemented lens at the d line is Ndn, an Abbe number of the positive lens of the third cemented lens at the d line is νdp, an Abbe number of the negative lens of the third cemented lens at the d line is νdn, a radius of curvature of a cemented surface of the third cemented lens is Rc, $\Delta\Phi FC = ((Ndn-1)/\nu dn - (Ndp-1)/\nu dp)/Rc$, and a focal length of the first lens group is f1, it is preferable that Conditional Expression (4) is satisfied, and it is more preferable that Conditional Expression (4-1) is satisfied.

$$-0.002 < \Delta\Phi FC \times f1 < -0.001 \quad (4)$$

$$-0.0018 < \Delta\Phi FC \times f1 < -0.0012 \quad (4\text{-}1)$$

An imaging apparatus of the present invention comprises the zoom lens of the present invention.

In the present description, it should be noted that the term "consists of ~" means that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and/or a hand shaking correction mechanism.

In addition, the term "~ group that has a positive refractive power" means that the group has a positive refractive power as a whole. It is the same for the term "~ group that has a negative refractive power". The "group" is not necessarily composed of a plurality of lenses, but may be composed of only one lens. Reference signs of refractive powers of the groups, reference signs of refractive powers of the lenses, and surface shapes of the lenses are assumed as those in paraxial regions in a case where some lenses have aspheric surfaces. The "negative meniscus lens" is a meniscus lens that has a negative refractive power. All the above-mentioned conditional expressions are based on the d line (a wavelength of 587.6 nm (nanometers)).

According to the present invention, the lens system consists of, in order from the object side, the first lens group having a positive refractive power, a second lens group having a negative refractive power, a third lens group having a positive refractive power, and a fourth lens group having a positive refractive power. In the lens system, by suitably setting the lens groups moving during zooming, the configuration of the first lens group, and the lenses moving during focusing, it is possible to provide a zoom lens, which is compatible with visible to near-infrared wavelength bands and is capable of achieving both a high zoom ratio and high performance while suppressing an increase in size of the lens system, and an imaging apparatus comprising the zoom lens.

BRIEF DESCRIPTION OF THE DRAWINGS

FIG. 2 is a cross-sectional view illustrating a configuration and an optical path of the zoom lens of FIG. 1 at the wide-angle end and the telephoto end.

FIG. 3 is a partial enlarged view of the zoom lens of FIG. 1.

FIG. 11 is a diagram of aberrations of the zoom lens according to Example 1 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 12 is a diagram of aberrations of the zoom lens according to Example 2 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

DESCRIPTION OF THE PREFERRED EMBODIMENTS

Figure 1:
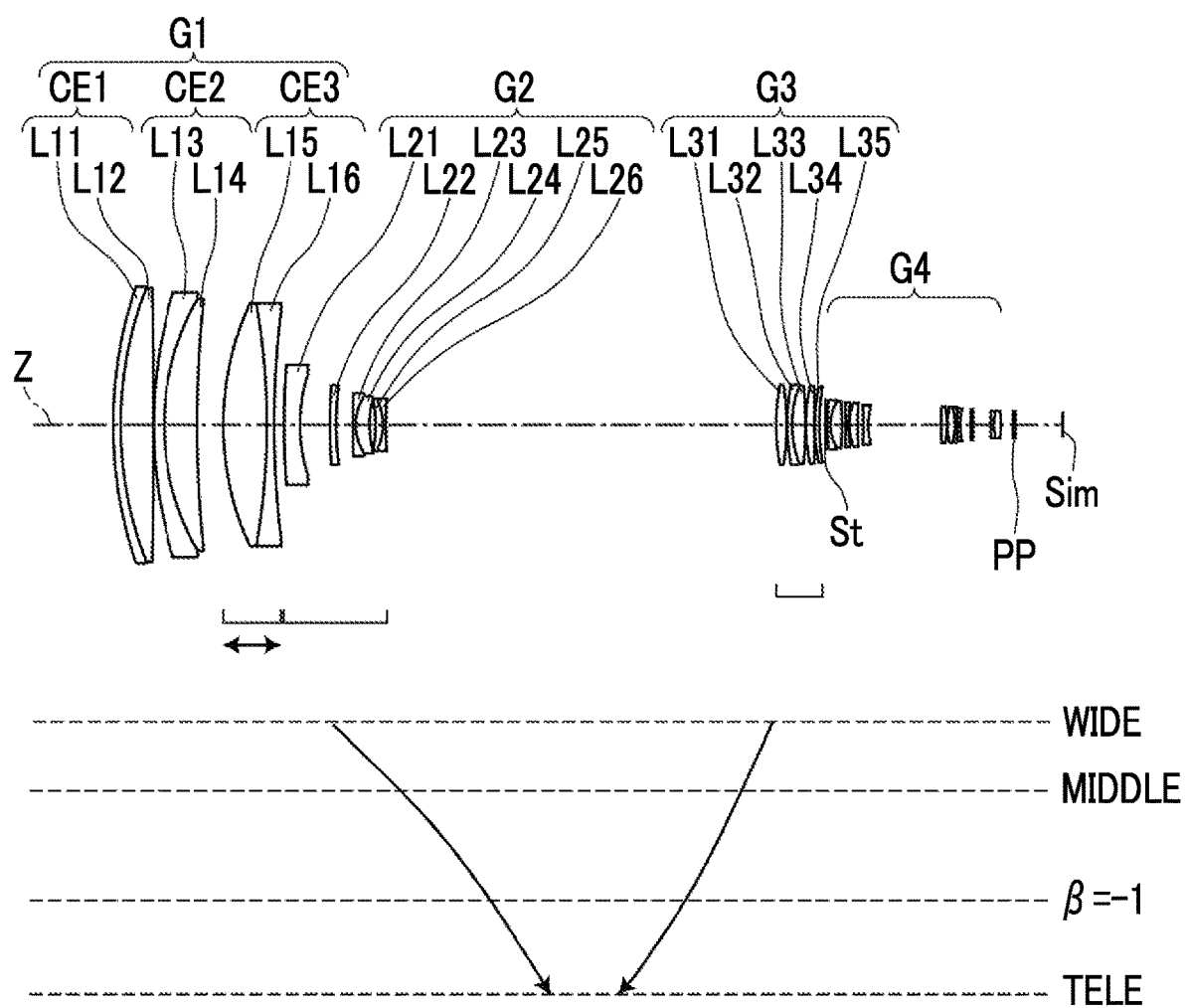
FIG. 1 is a cross-sectional view illustrating a configuration of a zoom lens according to an embodiment of the present invention and a zoom lens according to Example 1 at the wide-angle end and illustrating movement loci during zooming.

Hereinafter, embodiments of the present invention will be described with reference to drawings. FIG. 1 is a cross-sectional view illustrating a lens configuration of a zoom lens at the wide-angle end according to an embodiment of the present invention. FIG. 2 is a cross-sectional view illustrating a lens configuration and an optical path of the zoom lens at the wide-angle end and the telephoto end. In FIG. 2, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays ta and rays with the maximum angle of view tb are shown as rays. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side.

The zoom lens comprises, in order from the object side to the image side along the optical axis Z, a first lens group G1 that has a positive refractive power, a second lens group G2 that has a negative refractive power, a third lens group G3 that has a positive refractive power, and a fourth lens group G4 that has a positive refractive power. An aperture stop St is disposed to be closest to the object side in the fourth lens group G4. It should be noted that the aperture stop St shown in each of FIGS. 1 and 2 does not necessarily indicate its sizes and/or shapes, and indicates a position of the aperture stop St on the optical axis Z.

In order to mount the zoom lens on an imaging apparatus, it is preferable to provide various filters and/or a protective cover glass based on specification of the imaging apparatus. Thus, FIGS. 1 and 2 show an example where a plane-parallel-plate-like optical member PP, in which those are considered, is disposed between the lens system and the image plane Sim. However, a position of the optical member PP is not limited to that shown in this example, and it is also possible to adopt a configuration in which the optical member PP is omitted.

In this zoom lens, during zooming from the wide-angle end to the telephoto end, the first lens group G1 and the fourth lens group G4 remain stationary with respect to the image plane Sim, and the second lens group G2 and the third lens group G3 move in the direction of the optical axis by changing a relative distance therebetween in the direction of the optical axis. The second lens group G2 has a zoom function. The third lens group G3 has a function of correcting fluctuation in image plane caused by zooming. The fourth lens group G4 has an image forming function.

In a surveillance zoom lens having a four-group configuration, as a configuration different from that of the present embodiment, a type in which the third lens group G3 has a negative refractive power is considerable. However, in such a type, rays incident into the fourth lens group G4 become divergent rays, and the lens diameter of the fourth lens group G4 is increased. As a result, this causes an increase in size of the optical system. Since the fourth lens group G4 may be provided with an anti-vibration lens group that corrects blurring of a captured image and/or an extender lens group that changes a focal length of the whole system to a long focal length, the increase in diameter of the lens of the fourth lens group G4 is not preferable. In addition, in a case where it is attempted to increase the zoom ratio, residual chromatic aberration, which can not be corrected by the first lens group G1 on the telephoto side, becomes a problem. However, as in this embodiment, in a case where the third lens group G3 has a positive refractive power, the rays incident into the third lens group G3 on the telephoto side are widened. Thus, it becomes easy to correct the residual chromatic aberration, and it becomes possible to achieve high performance.

During zooming from the wide-angle end to the telephoto end, the zoom lens is configured such that the second lens group G2 and the third lens group G3 simultaneously pass points (points of inverted equal magnifications) at which respective lateral magnifications thereof are −1 times. In FIG. 1, the respective schematic curves of the movement loci of the second lens group G2 and the third lens group G3 during zooming from the wide-angle end to the telephoto end are shown by arrows below the respective lens groups. In addition, states respectively corresponding to the wide-angle end, the middle focal length state, the point at which the inverted equal magnification is obtained, and the telephoto end are indicated by horizontal dotted lines labeled WIDE, MIDDLE, $\beta=-1$, and TELE, respectively.

In order to achieve a high magnification ratio of 50 times or more, during zooming, it is necessary for the second lens group G2 having a negative refractive power and the third lens group G3 having a positive refractive power to simultaneously pass points at which respective lateral magnifications thereof are −1 times. The reason is that, in the case of such a configuration, the third lens group G3, which is generally set as a compensator group, acts not only on the correction of the image plane but also on the zooming itself, the magnification thereof is reduced on the wide-angle side and is increased on the telephoto side on the basis of the position at which the magnification is −1 times, whereby the zoom ratio can be increased.

The first lens group G1 of the zoom lens is configured to consist of, in order from the object side, a first cemented lens CE1 that is formed by cementing a negative meniscus lens and a positive lens in order from the object side, a second cemented lens CE2 that is formed by cementing a negative meniscus lens and a positive lens in order from the object side, and a third cemented lens CE3 that is formed by cementing a positive lens and a negative lens in order from the object side. During focusing from the object at infinity to the close-range object, only the third cemented lens CE3 moves. Therefore, the lenses other than the third cemented lens CE3 are configured to remain stationary with respect to the image plane Sim. Both arrows in the horizontal direction in FIG. 1 mean that the third cemented lens CE3 is a lens group moving during focusing.

By arranging lenses whose refractive powers and shapes are defined as described above in the first lens group G1, it is possible to increase the degree of freedom of aberration correction. Thus, by correcting the aberration, on which it is difficult to perform correction in a lens system having a high zoom ratio and a long focal length, on the telephoto side in a well-balanced manner, it becomes easy to realize a high-performance optical system compatible with a wide wavelength band from visible to near-infrared regions. In particular, by providing the third cemented lens CE3, it is possible to increase the absolute values of the radii of curvature of the cemented surfaces of the first cemented lens CE1 and the second cemented lens CE2, and it is possible to suppress the difference in spherical aberration caused by the first lens group G1 for each wavelength. As a result, even in a zoom lens having a zoom ratio of about 80 times, it is easy to achieve sufficient performance. In a case where the negative lens and the positive lens which compose each cemented lens are arranged to be close to each other without being cemented, the surfaces of which radii of curvature are close are set to be close to each other. Thus, there are concerns about occurrence of ghost and a decrease in yield due to deterioration in eccentric sensitivity.

In the example shown in FIG. 1, the first cemented lens CE1 consists of a lens L11 which is a negative meniscus lens convex toward the object side and a lens L12 which is a biconvex lens. The second cemented lens CE2 consists of a lens L13 which is a negative meniscus lens convex toward the object side and a lens L14 which is a positive meniscus lens convex toward the object side. The third cemented lens CE3 consists of a lens L15 which is a biconvex lens and a lens L16 which is a biconcave lens.

In the first cemented lens CE1 and the second cemented lens CE2, by cementing the negative meniscus lens and the positive lens in order from the object side, it becomes easy to form the cemented surface as a surface convex toward the object side. Since the incidence angle of the on-axis marginal ray on the telephoto side incident on the cemented surface having such a shape is small, it is possible to suppress the amount of aberration generated. By forming the third cemented lens CE3 as a cemented lens in which the positive lens and the negative lens are cemented in order from the object side, it becomes easy to maintain the refractive power required for focusing.

During focusing, only the third cemented lens CE3, which is a part of the first lens group G1, moves. As a focusing method in a zoom lens having a four-group configuration, a focusing method, in which the entire first lens group G1 is moved, is conceivable. However, in general, since the first lens group G1 has a large lens diameter and a heavy weight, in the focusing method for moving the entire first lens group G1, it is difficult to perform quick focusing which is important for surveillance application. In addition, by adopting a configuration in which the lens group moving during focusing consists of cemented lenses, it is possible to suppress fluctuation in chromatic aberration in a case where the object distance changes.

Further, it is assumed that a refractive index of the positive lens of the third cemented lens CE3 at a d line is Ndp, a refractive index of the negative lens of the third cemented lens CE3 at the d line is Ndn, an Abbe number of the positive lens of the third cemented lens CE3 at the d line is vdp, an Abbe number of the negative lens of the third cemented lens CE3 at the d line is vdn, and a radius of curvature of a cemented surface of the third cemented lens CE3 is Rc. By using those, ΔΦFC=((Ndn−1)/vdn−(Ndp−1)/vdp)/Rc is defined. In addition, it is assumed that a focal length of the first lens group G1 is f1. Then, it is preferable that the zoom lens satisfies Conditional Expression (4).

$$0.002<\Delta\Phi FC\times f1<-0.001 \tag{4}$$

Conditional Expression (4) is an expression relating to the difference ΔΦFC between the refractive powers of the cemented surface of the third cemented lens CE3 at the F line (a wavelength of 486.1 nm (nanometers)) and the C line (a wavelength of 656.3 nm (nanometers)). Assuming that the refractive indices of the positive lens of the third cemented lens CE3 at the F line and the C line are respectively NFp and NCp and the refractive indices of the negative lens of the third cemented lens CE3 at the F line and the C line are respectively NFn and NCn, the following expression is obtained.

$$\Delta\Phi FC=(NFn-NFp)/Rc-(NCn-NCp)/Rc=((NFn-NCn)-(NFp-NCp))/Rc$$

From the definition of the Abbe number, the following expressions are obtained.

$$vdn=(Ndn-1)/(NFn-NCn)$$

$$vdp=(Ndp-1)/(NFp-NCp)$$

As a result, the following expression is obtained.

$$\Delta\Phi FC=((Ndn-1)/vdn-(Ndp-1)/vdp)/Rc$$

Accordingly, ΔΦFC×f1 of Conditional Expression (4) is obtained by normalizing the difference between the refractive powers of the cemented surface of the third cemented lens CE3 at the F line and the C line with the focal length of the first lens group G1.

By not allowing the result of Conditional Expression (4) to be equal to or less than the lower limit, it is possible to reduce the amount of residual 2nd-order spectrum. As a result, it becomes easy to achieve high performance. By not allowing the result of Conditional Expression (4) to be equal to or greater than the upper limit, it is possible to correct the 1st-order chromatic aberration while suppressing the difference of the spherical aberration for each wavelength, in particular, correcting longitudinal chromatic aberration on the telephoto side. In order to enhance the effect relating to Conditional Expression (4), it is more preferable that Conditional Expression (4-1) is satisfied.

$$-0.0018<\Delta\Phi FC\times f1<-0.0012 \tag{4-1}$$

Further, assuming that an average value of Abbe numbers of all the positive lenses in the first lens group G1 at a d line is vavep and an average value of Abbe numbers of all the negative lenses in the first lens group G1 at the d line is vaven, it is preferable that the zoom lens satisfies Conditional Expression (2).

$$24<vavep-vaven<41 \tag{2}$$

Conditional Expression (2) defines the difference between the average value of the Abbe numbers of the positive lenses and the average value of the Abbe numbers of the negative lenses in the first lens group G1. In order to realize a zoom lens that has a high zoom ratio and high performance and that is capable of imaging even in the near-infrared region, it is required that the residual 2nd-order spectrum is small and the amount of fluctuation in chromatic aberration is small even in a case where the magnification is changed to a high magnification. By not allowing the result of Conditional Expression (2) to be equal to or less than the lower limit, it is possible to correct the 1st-order chromatic aberration without reducing the absolute value of the radius of curvature of the cemented surface of the cemented lens in the first lens group G1. Therefore, it is possible to prevent an increase in high order spherical aberration, and it is possible to suppress fluctuation in aberration during zooming. By not allowing the result of Conditional Expression (2) to be equal to or greater than the upper limit, there is an advantage in reducing the amount of residual 2nd-order spectrum, and it becomes easy to achieve high performance. In order to enhance the effect relating to Conditional Expression (2), it is more preferable that Conditional Expression (2-1) is satisfied.

$$27<\nu a\nu ep-\nu a\nu en<38 \tag{2-1}$$

Further, assuming that a focal length of the second lens group G2 is f2 and a focal length of the whole system at the telephoto end during focusing on the object at infinity is ft, it is preferable that the zoom lens satisfies Conditional Expression (1).

$$-0.019<f2/ft<-0.008 \tag{1}$$

Conditional Expression (1) defines a ratio of the focal length of the second lens group G2 to the focal length of the whole system at the telephoto end. By not allowing the result of Conditional Expression (1) to be equal to or less than the lower limit, it is possible to ensure the refractive power of the second lens group G2, and it is possible to suppress an amount of movement of the second lens group G2 during zooming from the wide-angle end to the telephoto end. As a result, there is an advantage in shortening the total optical length, and it becomes easy to achieve a decrease in size required in the market. By not allowing the result of Conditional Expression (1) to be equal to or greater than the upper limit, it is possible to prevent the refractive power of the second lens group G2 from becoming excessively strong, and thus it becomes easy to correct various aberrations. Further, at the time of assembly, it is possible to increase position tolerance, and thus it becomes easy to perform manufacturing. In order to enhance the effect relating to Conditional Expression (1), it is more preferable that Conditional Expression (1-1) is satisfied.

$$-0.017<f2/ft<-0.01 \tag{1-1}$$

In the example shown in FIG. 1, the second lens group G2 consists of six lenses L21 to L26 in order from the object side. The third lens group G3 consists of five lenses L31 to L35 in order from the object side. FIG. 3 is an enlarged view of a part of the zoom lens of FIG. 1 ranging from the fourth lens group G4 to the image plane Sim. The fourth lens group G4 in the example of FIG. 3 consists of, in order from the object side, the aperture stop St, lenses L41 to L49, a filter FL, and lenses L50 and L51. However, in the present invention, the filter FL of the fourth lens group G4 is not an indispensable constituent element, and it is also possible to adopt a configuration in which the filter FL is omitted.

In the zoom lens of the present embodiment, as shown in FIG. 3, it is preferable that the fourth lens group G4 comprises a fourth-a lens group G4a that has a negative refractive power and includes one negative lens and one positive lens, a fourth-b lens group G4b that has a negative refractive power and is disposed on the image side of the fourth-a lens group G4a, and a fourth-c lens group G4c that has a positive refractive power and is disposed on the image side of the fourth-b lens group G4b so as to be separated from the fourth-b lens group G4b by an air gap which is longest on the optical axis in the fourth lens group G4. It is preferable that blurring in a captured image is corrected by moving only the fourth-b lens group G4b in a direction perpendicular to the optical axis Z. Both vertical arrows in FIG. 3 mean that the fourth-b lens group G4b is an anti-vibration lens group that moves in order to correct blurring.

Further, it is preferable that assuming that a focal length of the fourth-a lens group G4a is f4a and a focal length of the fourth-b lens group G4b is f4b, Conditional Expression (3) is satisfied.

$$2.4<f4a/f4b<6.6 \tag{3}$$

Conditional Expression (3) defines a ratio of the focal length of the fourth-a lens group G4a and the focal length of the fourth-b lens group G4b movable as anti-vibration lens groups in the direction perpendicular to the optical axis Z. By not allowing the result of Conditional Expression (3) to be equal to or less than the lower limit, the refractive power of the fourth-a lens group G4a can be suppressed, the effect of divergence of the fourth-a lens group G4a diverging rays can be weakened, and thus it is possible to prevent the size and the weight of the fourth-b lens group G4b from becoming increased. As a result, it becomes easy to perform quick anti-vibration control. By not allowing the result of Conditional Expression (3) to be equal to or greater than the upper limit, the refractive power of the fourth-b lens group G4b can be suppressed, and thus it is possible to reduce the amount of change in performance caused by the manufacturing error and the assembly error of the lenses composing the fourth-b lens group G4b. As a result, it becomes easy to obtain a favorable image. In order to enhance the effect relating to Conditional Expression (3), it is more preferable that Conditional Expression (3-1) is satisfied.

$$2.8<f4a/f4b<6.2 \tag{3-1}$$

For example, the fourth-a lens group G4a can be configured to consist of one group of cemented lenses, and the fourth-b lens group G4b can be configured to consist of one or more single lenses which are not cemented. In the example of FIG. 3, the fourth-b lens group G4b consists of three single lenses. The fourth lens group G4 in the example of FIG. 3 has only the fourth-a lens group G4a, the fourth-b lens group G4b, and the fourth-c lens group G4c as the lens groups. More specifically, in the fourth-a lens group G4a, the negative lens L41 and the positive lens L42 are cemented in order from the object side. The fourth-b lens group G4b consists of, in order from the object side, the negative lens L43, the positive lens L44, and the negative lens L45. The fourth-c lens group G4c consists of, in order from the object side, the lenses L46 to L49, the filter FL, and the lenses L50 and L51.

Figure 4:
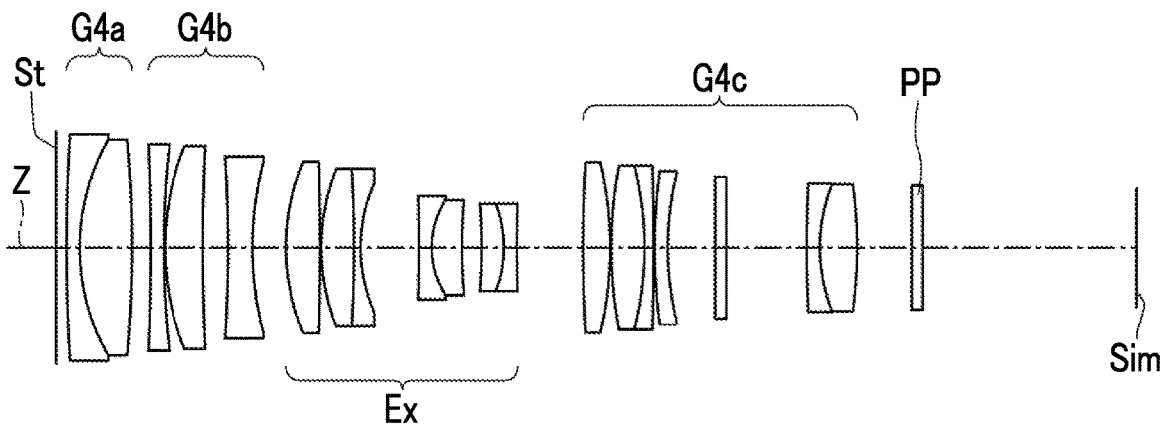
FIG. 4 is a cross-sectional view of the zoom lens in a state in which an extender lens group is inserted in the lens system of FIG. 4.

In a case of adopting the preferred configuration of the fourth lens group G4, it is preferable that an extender lens group Ex is detachably disposed to change the focal length of the whole system to a long focal length by being inserted in the optical path between the fourth-b lens group G4b and the fourth-c lens group G4c. FIG. 4 shows a configuration example in which the extender lens group Ex is disposed in the fourth lens group G4 of FIG. 3.

Since it is necessary to drive the anti-vibration lens group and the extender lens group Ex with a driving device, if a stationary lens group is disposed between the anti-vibration lens group and the extender lens group Ex, the system becomes mechanically complicated, and thus this configuration is not preferable. However, in the example of FIG. 4, the system can be simplified mechanically in terms of this point.

The examples shown in FIGS. 1 to 4 are just examples, and the zoom lens of the present invention may adopt a configuration different from that of these examples. For example, the number of lenses composing each of the lens groups other than the first lens group G1 may be different from those of the examples of FIGS. 1 to 4.

Further, it should be noted that the above-mentioned preferred configurations and available configurations may be arbitrary combinations, and it is preferable to selectively adopt the configurations in accordance with required specification. According to the present embodiment, it is possible to realize a zoom lens that is compatible with visible to near-infrared wavelength bands and has a high zoom ratio and high performance while suppressing an increase in size of the lens system. The "high zoom ratio" described herein means 80 times or more.

Next, numerical examples of the zoom lens of the present invention will be described.

Example 1

A lens configuration of a zoom lens of Example 1 is shown in FIGS. 1 to 4, and an illustration method thereof is as described above. Therefore, repeated description is partially omitted herein. The zoom lens of Example 1 consists of, in order from the object side, a first lens group G1 having a positive refractive power, a second lens group G2 having a negative refractive power, a third lens group G3 having a positive refractive power, and a fourth lens group G4 having a positive refractive power. An aperture stop St is disposed to be closest to the object side in the fourth lens group G4. During zooming from the wide-angle end to the telephoto end, the first lens group G1 and the fourth lens group G4 remain stationary with respect to the image plane Sim, the second lens group G2 and the third lens group G3 move by changing a relative distance therebetween, and the second lens group G2 and the third lens group G3 simultaneously pass points at which respective lateral magnifications thereof are −1 times. The first lens group G1 consists of, in order from the object side, a first cemented lens CE1, a second cemented lens CE2, and a third cemented lens CE3. During focusing from the object at infinity to the close-range object, only the third cemented lens CE3 moves to the object side, and the other lenses remain stationary with respect to the image plane Sim. The fourth lens group G4 has, in order from the object side, a fourth-a lens group G4a having a negative refractive power, a fourth-b lens group G4b having a negative refractive power, and a fourth-c lens group G4c having a positive refractive power. The anti-vibration lens group consists of only the fourth-b lens group G4b. The above is a schematic configuration of the zoom lens of Example 1.

Table 1 shows basic lens data of the zoom lens of Example 1, and Table 2 shows specification and variable surface distances. In Table 1, the column of Si shows i-th (i=1, 2, 3, . . . ) surface number. The i-th surface number is attached to each of surfaces of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side in a case where the element closest to the object side is regarded as the first element. The column of □dj shows an Abbe number of the j-th element on the basis of the d line.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances are referenced by the reference signs DD[ ], and are written into places of Di, where object side surface numbers of distances are noted in [ ].

In Table 2, values of the zoom ratio Zr, the focal length f of the whole system, the back focal length Bf in terms of the air conversion distance, the F number FNo., the maximum total angle of view 2ω, and variable surface distance are based on the d line. (o) in the place of 2ω indicates that the unit thereof is a degree. In Table 2, values in the wide-angle end state, the middle focal length state, and the telephoto end state are respectively shown in the columns labeled by WIDE, MIDDLE, and TELE. The values in Tables 1 and 2 are values in a state where the extender lens group Ex is not inserted during focusing on the object at infinity.

Table 3 shows the basic lens data of the zoom lens of Example 1 in a state where the object at infinity is in focus after the extender lens group Ex is inserted, and Table 4 shows specifications and variable surface distances. The methods of listing in Tables 3 and 4 are the same as those in Tables 1 and 2.

In data of each of the following tables, a degree is used as a unit of an angle, and mm is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | νdj |
|---|---|---|---|---|
| 1 | 156.4086 | 3.08 | 1.48749 | 70.24 |
| 2 | 137.5715 | 13.53 | 1.49700 | 81.61 |
| 3 | −2690.4796 | 0.12 | | |
| 4 | 164.6514 | 4.35 | 1.83481 | 42.74 |
| 5 | 91.0753 | 13.89 | 1.43875 | 94.66 |
| 6 | 430.1425 | 10.83 | | |
| 7 | 106.9569 | 17.92 | 1.43875 | 94.66 |
| 8 | −252.2113 | 3.00 | 1.48749 | 70.24 |
| 9 | 341.4095 | DD [9] | | |
| 10 | 284.2409 | 6.75 | 1.72916 | 54.09 |
| 11 | 60.6573 | 12.34 | | |
| 12 | 191.2295 | 2.55 | 1.74400 | 44.79 |
| 13 | 108.0008 | 6.92 | | |
| 14 | 542.6107 | 1.20 | 1.72916 | 54.68 |
| 15 | 19.5355 | 5.75 | 1.80518 | 25.42 |
| 16 | 40.7180 | 2.49 | | |
| 17 | −51.6120 | 3.02 | 1.80518 | 25.42 |
| 18 | −21.5784 | 1.20 | 1.80400 | 46.53 |
| 19 | 157.5596 | DD [19] | | |
| 20 | 79.0108 | 4.37 | 1.49700 | 81.61 |
| 21 | −90.0809 | 0.25 | | |
| 22 | 81.7932 | 1.98 | 1.95375 | 32.32 |
| 23 | 39.3065 | 5.54 | 1.43875 | 94.66 |
| 24 | −142.7652 | 0.12 | | |
| 25 | 66.0348 | 3.41 | 1.43875 | 94.66 |
| 26 | 1088.9005 | 0.28 | | |
| 27 | 67.5826 | 1.85 | 1.53996 | 59.46 |
| 28 | 89.5693 | DD [28] | | |
| 29(St) | ∞ | 0.95 | | |
| 30 | 145.8665 | 1.20 | 1.83481 | 42.74 |
| 31 | 17.4733 | 4.77 | 1.57099 | 50.80 |
| 32 | −96.7195 | 1.74 | | |
| 33 | −192.4293 | 1.20 | 1.72916 | 54.09 |

TABLE 1-continued

Example 1

| Si | Ri | Di | Ndj | vdj |
|---|---|---|---|---|
| 34 | 73.6980 | 0.12 | | |
| 35 | 21.4302 | 3.50 | 1.69895 | 30.13 |
| 36 | 168.6999 | 2.30 | | |
| 37 | −113.5989 | 2.25 | 1.80400 | 46.58 |
| 38 | 26.5194 | 30.03 | | |
| 39 | 118.5955 | 2.46 | 1.68893 | 31.07 |
| 40 | −29.4085 | 0.12 | | |
| 41 | 34.4098 | 3.04 | 1.49700 | 81.54 |
| 42 | −26.4219 | 0.80 | 1.83481 | 42.74 |
| 43 | −405.2746 | 0.12 | | |
| 44 | 45.0504 | 1.20 | 1.78590 | 44.20 |
| 45 | 24.6473 | 4.36 | | |
| 46 | ∞ | 1.00 | 1.51680 | 64.20 |
| 47 | ∞ | 7.28 | | |
| 48 | 106.6556 | 1.20 | 1.89190 | 37.13 |
| 49 | 13.5664 | 3.35 | 1.49700 | 81.54 |
| 50 | −36.3850 | 5.00 | | |
| 51 | ∞ | 1.00 | 1.51633 | 64.05 |
| 52 | ∞ | 19.41 | | |

TABLE 2

Example 1

| | WIDE | MIDDLE | TELE |
|---|---|---|---|
| Zr | 1.0 | 8.9 | 80.0 |
| f | 14.48 | 129.48 | 1158.07 |
| Bf | 25.07 | 25.07 | 25.07 |
| FNo. | 3.61 | 3.66 | 10.83 |
| 2ω (°) | 33.0 | 4.0 | 0.4 |
| DD [9] | 4.06 | 74.69 | 93.76 |
| DD [19] | 160.44 | 68.12 | 0.60 |
| DD [28] | 2.41 | 24.10 | 72.56 |

TABLE 3

Example 1 After Insertion of Extender Lens Group

| Si | Ri | Di | Ndj | vdj |
|---|---|---|---|---|
| 1 | 156.4086 | 3.08 | 1.48749 | 70.24 |
| 2 | 137.5715 | 13.53 | 1.49700 | 81.61 |
| 3 | −2690.4796 | 0.12 | | |
| 4 | 164.6514 | 4.35 | 1.83481 | 42.74 |
| 5 | 91.0753 | 13.89 | 1.43875 | 94.66 |
| 6 | 430.1425 | 10.83 | | |
| 7 | 106.9969 | 17.92 | 1.43875 | 94.66 |
| 8 | −252.2113 | 3.00 | 1.48749 | 70.24 |
| 9 | 341.4095 | DD [9] | | |
| 10 | 284.2409 | 6.75 | 1.72916 | 54.09 |
| 11 | 60.6573 | 12.34 | | |
| 12 | 191.2295 | 2.55 | 1.74400 | 44.79 |
| 13 | 108.0008 | 6.92 | | |
| 14 | 542.6107 | 1.20 | 1.72916 | 54.68 |
| 15 | 19.5355 | 5.75 | 1.80518 | 25.42 |
| 16 | 40.7180 | 2.49 | | |
| 17 | −51.6120 | 3.02 | 1.80518 | 25.42 |
| 18 | −21.5784 | 1.20 | 1.80400 | 46.53 |
| 19 | 157.5596 | DD [19] | | |
| 20 | 79.0108 | 4.37 | 1.49700 | 81.61 |
| 21 | −90.0809 | 0.25 | | |
| 22 | 81.7932 | 1.98 | 1.95375 | 32.32 |
| 23 | 39.3065 | 5.54 | 1.43875 | 94.66 |
| 24 | −142.7652 | 0.12 | | |
| 25 | 66.0348 | 3.41 | 1.43875 | 94.66 |
| 26 | 1088.9005 | 0.28 | | |
| 27 | 67.5826 | 1.85 | 1.53996 | 59.46 |
| 28 | 89.5693 | DD [28] | | |
| 29(St) | ∞ | 0.95 | | |
| 30 | 145.8665 | 1.20 | 1.83481 | 42.74 |

TABLE 3-continued

Example 1 After Insertion of Extender Lens Group

| Si | Ri | Di | Ndj | vdj |
|---|---|---|---|---|
| 31 | 17.4733 | 4.77 | 1.57099 | 50.80 |
| 32 | −96.7195 | 1.74 | | |
| 33 | −192.4293 | 1.20 | 1.72916 | 54.09 |
| 34 | 73.6980 | 0.12 | | |
| 35 | 21.4302 | 3.50 | 1.69895 | 30.13 |
| 36 | 168.6999 | 2.30 | | |
| 37 | −113.5989 | 2.25 | 1.80400 | 46.58 |
| 38 | 26.5194 | 3.00 | | |
| 39 | 17.6693 | 3.09 | 1.49700 | 81.54 |
| 40 | −280.7444 | 0.12 | | |
| 41 | 16.7128 | 3.02 | 1.95375 | 32.32 |
| 42 | −113.2840 | 0.60 | 1.80518 | 25.42 |
| 43 | 12.5894 | 5.23 | | |
| 44 | −217.2219 | 1.20 | 1.77250 | 49.60 |
| 45 | 7.0812 | 2.75 | 1.63930 | 44.87 |
| 46 | 42.2405 | 1.80 | | |
| 47 | −44.8210 | 2.02 | 1.89286 | 20.36 |
| 48 | −9.7429 | 1.20 | 1.89190 | 37.13 |
| 49 | 81.9278 | 6.00 | | |
| 50 | 118.5955 | 2.46 | 1.68893 | 31.07 |
| 51 | −29.4085 | 0.12 | | |
| 52 | 34.4098 | 3.04 | 1.49700 | 81.54 |
| 53 | −26.4219 | 0.80 | 1.83481 | 42.74 |
| 54 | −405.2746 | 0.12 | | |
| 55 | 45.0504 | 1.20 | 1.78590 | 44.20 |
| 56 | 24.6473 | 4.36 | | |
| 57 | ∞ | 1.00 | 1.51680 | 64.20 |
| 58 | ∞ | 7.28 | | |
| 59 | 106.6556 | 1.20 | 1.89190 | 37.13 |
| 60 | 13.5664 | 3.35 | 1.49700 | 81.54 |
| 61 | −36.3850 | 5.00 | | |
| 62 | ∞ | 1.00 | 1.51633 | 64.05 |
| 63 | ∞ | 19.58 | | |

TABLE 4

Example 1 After Insertion of Extender Lens Group

| | WIDE | MIDDLE | TELE |
|---|---|---|---|
| Zr | 1.0 | 8.9 | 80.0 |
| f | 24.12 | 215.78 | 1929.99 |
| Bf | 30.26 | 30.26 | 30.26 |
| FNo. | 7.25 | 7.32 | 20.57 |
| 2ω (°) | 17.2 | 2.0 | 0.2 |
| DD [9] | 4.06 | 74.69 | 93.76 |
| DD [19] | 160.44 | 68.12 | 0.60 |
| DD [28] | 2.41 | 24.10 | 72.56 |

FIG. 11 shows a diagram of aberrations of the zoom lens of Example 1. FIG. 11 shows a state in which the extender lens group Ex is not inserted and an object at an object distance of 50 m is in focus. In FIG. 11, in order from the left side, spherical aberration, astigmatism, distortion, and lateral chromatic aberration are shown. In FIG. 11, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and a wavelength of 880 nm (nanometers) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the wavelength of 880 nm (nanometers) are respectively indicated by the long dashed line, the short dashed line, and the gray solid line. In the spherical aberration diagram, FNo. indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 5:
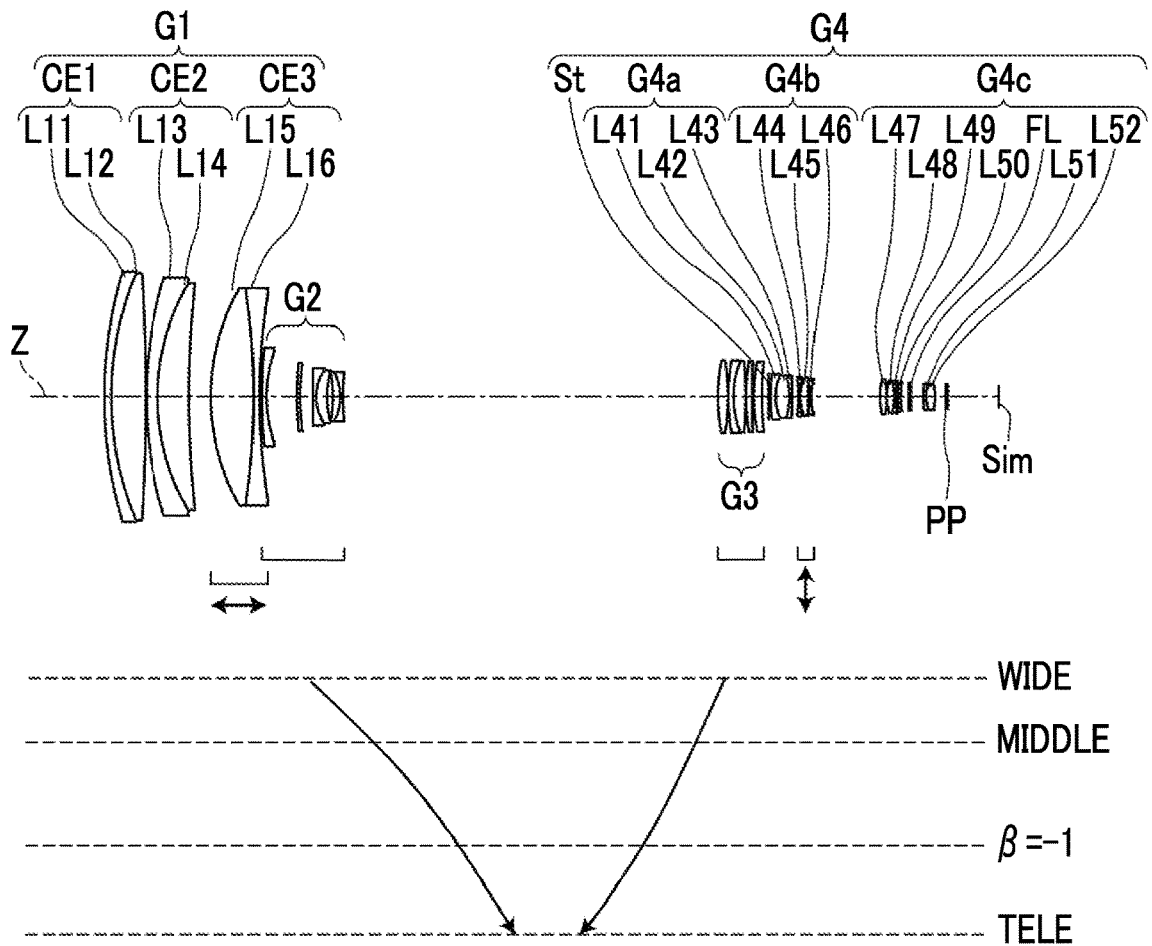
FIG. 5 is a cross-sectional view illustrating a configuration of a zoom lens according to Example 2 of the present invention at the wide-angle end and a movement locus thereof during zooming.
Figure 6:
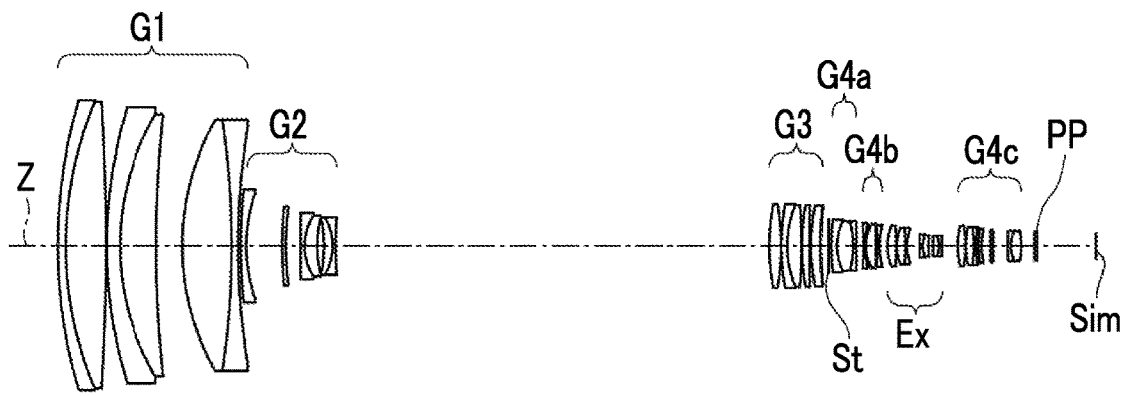
FIG. 6 is a cross-sectional view of the zoom lens in a state in which an extender lens group is inserted in the zoom lens of FIG. 5.

FIG. 5 shows a cross-sectional view of a lens configuration in a state where the extender lens group Ex of the zoom lens of Example 2 is not inserted and a movement locus thereof. FIG. 6 shows a cross-sectional view of the zoom lens of Example 2 after the extender lens group Ex is inserted. FIGS. 5 and 6 show the zoom lens in a state in which the object at infinity is in focus.

The schematic configuration of the zoom lens of Example 2 is the same as that of Example 1. However, the fourth-a lens group G4a of Example 2 consists of lenses L41 to L43 in order from the object side, the fourth-b lens group G4b consists of lenses L44 to L46 in order from the object side, and the fourth-c lens group G4c consists of lenses L47 to L50, a filter FL, and lenses L51 and L52 in order from the object side.

Table 5 shows basic lens data in a state in which the extender lens group Ex of the zoom lens of Example 2 is not inserted, and Table 6 shows specifications and variable surface distances. Table 7 shows the basic lens data of the zoom lens of Example 2 after the extender lens group Ex is inserted, and Table 8 shows specifications and variable surface distances. Tables 5 to 8 are tables in a state where the object at infinity is in focus. FIG. 12 shows a diagram of aberrations of the zoom lens of Example 2 in a state in which the extender lens group Ex is not inserted and an object at an object distance of 50 m is in focus.

TABLE 5

Example 2

| Si | Ri | Di | Ndj | vdj |
|---|---|---|---|---|
| 1 | 181.2470 | 3.08 | 1.53996 | 59.46 |
| 2 | 132.5132 | 15.29 | 1.49700 | 81.54 |
| 3 | −808.2407 | 0.26 | | |
| 4 | 168.8248 | 5.17 | 1.83481 | 42.74 |
| 5 | 93.5573 | 13.86 | 1.43875 | 94.66 |
| 6 | 443.7902 | 9.62 | | |
| 7 | 92.5144 | 18.69 | 1.43875 | 94.66 |
| 8 | −315.3012 | 2.47 | 1.48749 | 70.24 |
| 9 | 264.1823 | DD [9] | | |
| 10 | 205.0760 | 2.08 | 1.72916 | 54.09 |
| 11 | 57.9382 | 13.42 | | |
| 12 | 162.4751 | 1.34 | 1.74400 | 44.79 |
| 13 | 105.6408 | 5.68 | | |
| 14 | 788.3327 | 1.49 | 1.72916 | 54.68 |
| 15 | 20.0530 | 4.82 | 1.80518 | 25.42 |
| 16 | 42.4563 | 2.56 | | |
| 17 | −51.2088 | 3.27 | 1.80518 | 25.42 |
| 18 | −21.3806 | 1.20 | 1.80400 | 46.53 |
| 19 | 144.3332 | DD [19] | | |
| 20 | 77.6675 | 4.44 | 1.49700 | 81.54 |
| 21 | −94.8086 | 0.12 | | |
| 22 | 81.1880 | 2.27 | 1.95375 | 32.32 |
| 23 | 39.4494 | 5.42 | 1.43875 | 94.66 |

TABLE 5-continued

Example 2

| Si | Ri | Di | Ndj | vdj |
|---|---|---|---|---|
| 24 | −167.9866 | 0.12 | | |
| 25 | 85.9703 | 2.83 | 1.43875 | 94.66 |
| 26 | 992.4127 | 0.56 | | |
| 27 | 71.5275 | 3.58 | 1.51633 | 64.14 |
| 28 | 128.2326 | DD [28] | | |
| 29 (St) | ∞ | 0.95 | | |
| 30 | 88.3719 | 2.19 | 1.83481 | 42.74 |
| 31 | 21.4639 | 6.07 | 1.51742 | 52.43 |
| 32 | −32.4882 | 1.20 | 1.51633 | 64.14 |
| 33 | −1355.5219 | 2.70 | | |
| 34 | −127.4034 | 0.80 | 1.51633 | 64.14 |
| 35 | 52.0478 | 0.12 | | |
| 36 | 19.4913 | 3.41 | 1.66680 | 33.05 |
| 37 | 973.8123 | 0.61 | | |
| 38 | −81.1582 | 0.80 | 1.83481 | 42.74 |
| 39 | 28.4078 | 30.00 | | |
| 40 | 32.9603 | 2.91 | 1.63980 | 34.47 |
| 41 | −49.6344 | 0.12 | | |
| 42 | 27.3244 | 3.11 | 1.49700 | 81.54 |
| 43 | −37.7052 | 0.80 | 1.72916 | 54.09 |
| 44 | 36.0620 | 1.00 | | |
| 45 | 57.8032 | 1.20 | 1.81600 | 46.62 |
| 46 | 34.3027 | 3.38 | | |
| 47 | ∞ | 1.00 | 1.51680 | 64.20 |
| 48 | ∞ | 5.56 | | |
| 49 | 101.6995 | 1.20 | 1.89190 | 37.13 |
| 50 | 12.3482 | 3.92 | 1.49700 | 81.54 |
| 51 | −25.3301 | 5.00 | | |
| 52 | ∞ | 1.00 | 1.51633 | 64.05 |
| 53 | ∞ | 22.38 | | |

TABLE 6

Example 2

| | WIDE | MIDDLE | TELE |
|---|---|---|---|
| Zr | 1.0 | 8.9 | 80.0 |
| f | 14.49 | 129.63 | 1159.48 |
| Bf | 28.04 | 28.04 | 28.04 |
| FNo. | 3.61 | 3.83 | 10.85 |
| 2ω (°) | 32.8 | 4.0 | 0.4 |
| DD [9] | 1.01 | 71.89 | 90.92 |
| DD [19] | 164.33 | 70.66 | 0.89 |
| DD [28] | 3.00 | 25.77 | 76.53 |

TABLE 7

Example 2 After Insertion of Extender Lens Group

| Si | Ri | Di | Ndj | vdj |
|---|---|---|---|---|
| 1 | 181.2470 | 3.08 | 1.53996 | 59.46 |
| 2 | 132.5132 | 15.29 | 1.49700 | 81.54 |
| 3 | −808.2407 | 0.26 | | |
| 4 | 168.8248 | 5.17 | 1.83481 | 42.74 |
| 5 | 93.5573 | 13.86 | 1.43875 | 94.66 |
| 6 | 443.7902 | 9.62 | | |
| 7 | 92.5144 | 18.69 | 1.43875 | 94.66 |
| 8 | −315.3012 | 2.47 | 1.48749 | 70.24 |
| 9 | 264.1823 | DD [9] | | |
| 10 | 205.0760 | 2.08 | 1.72916 | 54.09 |
| 11 | 57.9382 | 13.42 | | |
| 12 | 162.4751 | 1.34 | 1.74400 | 44.79 |
| 13 | 105.6408 | 5.68 | | |
| 14 | 788.3327 | 1.49 | 1.72916 | 54.68 |
| 15 | 20.0530 | 4.82 | 1.80518 | 25.42 |
| 16 | 42.4563 | 2.56 | | |
| 17 | −51.2088 | 3.27 | 1.80518 | 25.42 |
| 18 | −21.3806 | 1.20 | 1.80400 | 46.53 |
| 19 | 144.3332 | DD [19] | | |

TABLE 7-continued

Example 2 After Insertion of Extender Lens Group

| Si | Ri | Di | Ndj | vdj |
|---|---|---|---|---|
| 20 | 77.6675 | 4.44 | 1.49700 | 81.54 |
| 21 | −94.8086 | 0.12 | | |
| 22 | 81.1880 | 2.27 | 1.95375 | 32.32 |
| 23 | 39.4494 | 5.42 | 1.43875 | 94.66 |
| 24 | −167.9866 | 0.12 | | |
| 25 | 85.9703 | 2.83 | 1.43875 | 94.66 |
| 26 | 992.4127 | 0.56 | | |
| 27 | 71.5275 | 3.58 | 1.51633 | 64.14 |
| 28 | 128.2326 | DD [28] | | |
| 29 (St) | ∞ | 0.95 | | |
| 30 | 88.3719 | 2.19 | 1.83481 | 42.74 |
| 31 | 21.4639 | 6.07 | 1.51742 | 52.43 |
| 32 | −32.4882 | 1.20 | 1.51633 | 64.14 |
| 33 | −1355.5219 | 2.70 | | |
| 34 | −127.4034 | 0.80 | 1.51633 | 64.14 |
| 35 | 52.0478 | 0.12 | | |
| 36 | 19.4913 | 3.41 | 1.66680 | 33.05 |
| 37 | 973.8123 | 0.61 | | |
| 38 | −81.1582 | 0.80 | 1.83481 | 42.74 |
| 39 | 28.4078 | 3.00 | | |
| 40 | 19.5411 | 3.35 | 1.49700 | 81.54 |
| 41 | −108.0478 | 0.20 | | |
| 42 | 17.1596 | 3.20 | 1.95375 | 32.32 |
| 43 | −93.0949 | 0.65 | 1.80518 | 25.42 |
| 44 | 14.8243 | 5.09 | | |
| 45 | −46.1951 | 1.23 | 1.80400 | 46.53 |
| 46 | 9.2977 | 2.14 | 1.49700 | 81.54 |
| 47 | 28.2257 | 1.80 | | |
| 48 | −260.6196 | 2.14 | 1.89286 | 20.36 |
| 49 | −11.2418 | 1.20 | 1.89190 | 37.13 |
| 50 | 102.3274 | 6.00 | | |
| 51 | 32.9603 | 2.91 | 1.63980 | 34.47 |
| 52 | −49.6344 | 0.12 | | |
| 53 | 27.3244 | 3.11 | 1.49700 | 81.54 |
| 54 | −37.7052 | 0.80 | 1.72916 | 54.09 |
| 55 | 36.0620 | 1.00 | | |
| 56 | 57.8032 | 1.20 | 1.81600 | 46.62 |
| 57 | 34.3027 | 3.38 | | |
| 58 | ∞ | 1.00 | 1.51680 | 64.20 |
| 59 | ∞ | 5.56 | | |
| 60 | 101.6995 | 1.20 | 1.89190 | 37.13 |
| 61 | 12.3482 | 3.92 | 1.49700 | 81.54 |
| 62 | −25.3301 | 5.00 | | |
| 63 | ∞ | 1.00 | 1.51633 | 64.05 |
| 64 | ∞ | 22.34 | | |

TABLE 8

Example 2 After Insertion of Extender Lens Group

| | WIDE | MIDDLE | TELE |
|---|---|---|---|
| Zr | 1.0 | 8.9 | 80.0 |
| f | 25.86 | 231.31 | 2068.88 |
| Bf | 32.39 | 32.39 | 32.39 |
| FNo. | 7.24 | 7.66 | 21.17 |
| 2ω (°) | 17.2 | 2.0 | 0.2 |
| DD [9] | 1.01 | 71.89 | 90.92 |
| DD [19] | 164.33 | 70.66 | 0.89 |
| DD [28] | 3.00 | 25.77 | 76.53 |

Example 3

Figure 7:
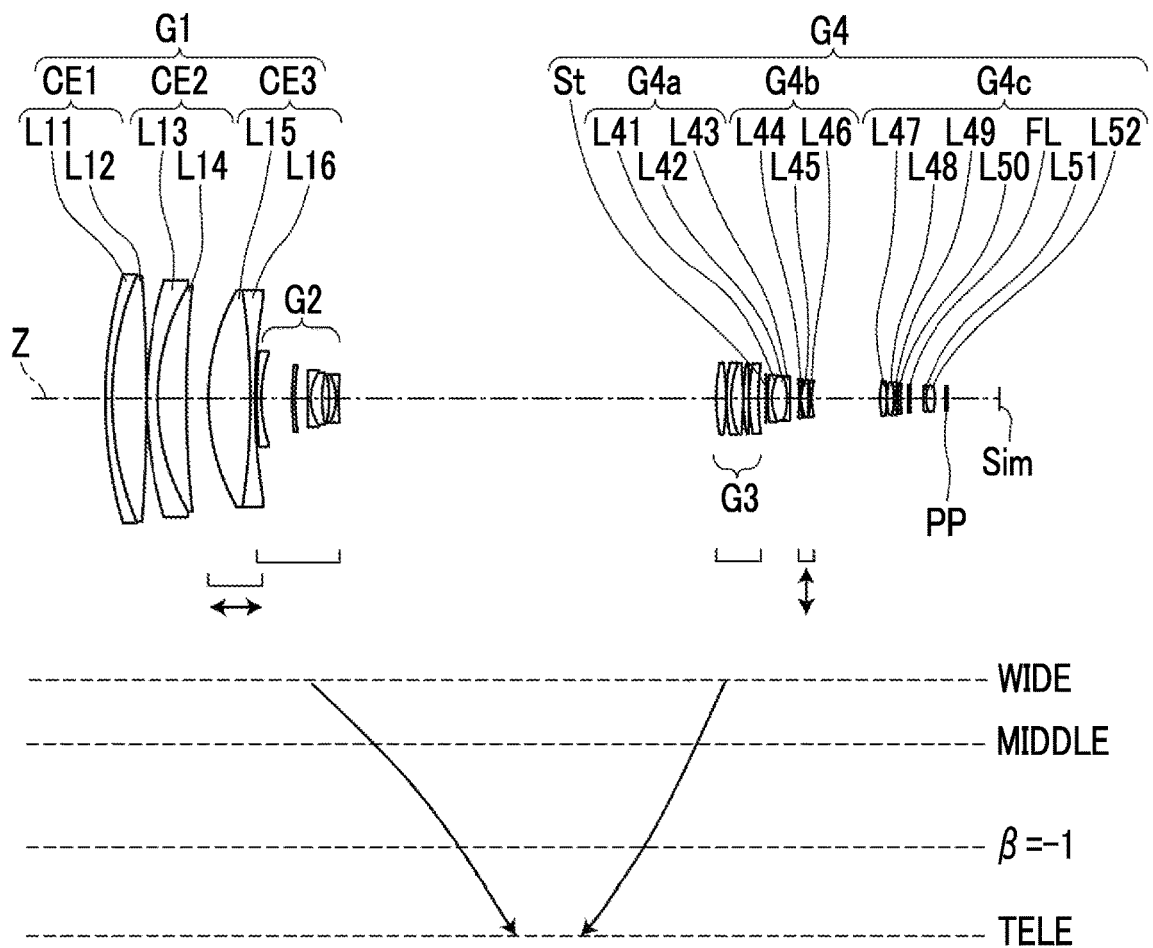
FIG. 7 is a cross-sectional view illustrating a configuration of a zoom lens according to Example 3 of the present invention at the wide-angle end and a movement locus thereof during zooming.
Figure 8:
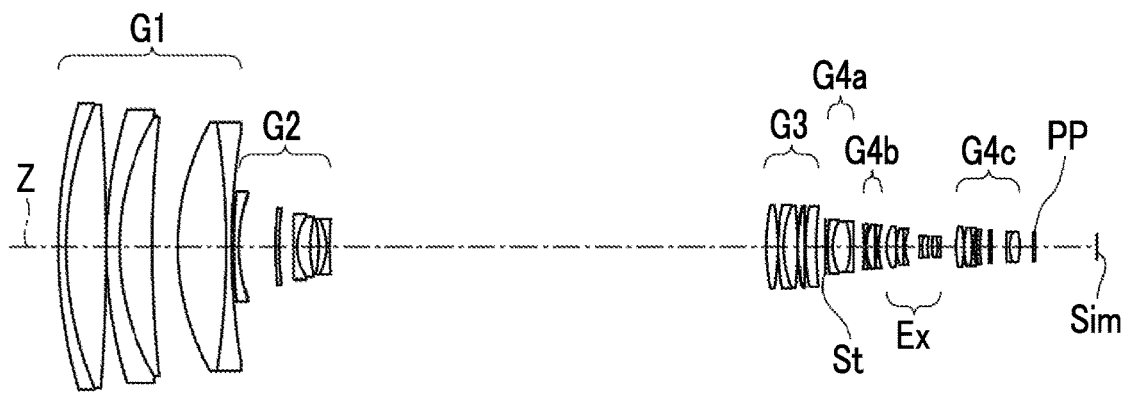
FIG. 8 is a cross-sectional view of the zoom lens in a state in which an extender lens group is inserted in the zoom lens of FIG. 7.

FIG. 7 shows a cross-sectional view of a lens configuration in a state where the extender lens group Ex of the zoom lens of Example 3 is not inserted and a movement locus thereof. FIG. 8 shows a cross-sectional view of the zoom lens of Example 3 after the extender lens group Ex is inserted. FIGS. 7 and 8 show the zoom lens in a state in which the object at infinity is in focus. The schematic configuration of the zoom lens of Example 3 is the same as that of Example 1. The number of lenses composing each of the fourth-a lens group G4a, the fourth-b lens group G4b, and the fourth-c lens group G4c of the zoom lens of Example 3 is the same as that of Example 2.

Figure 13:
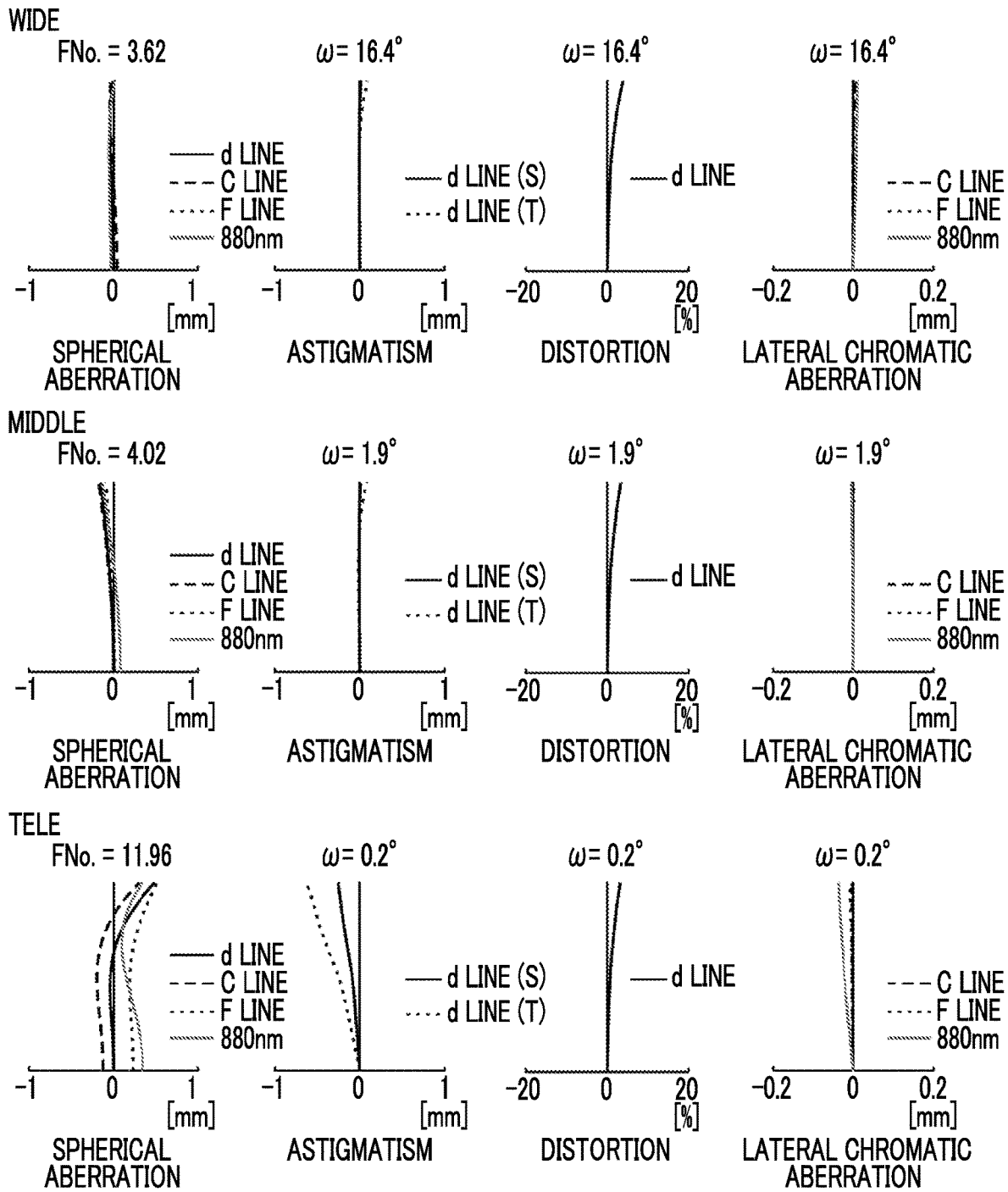
FIG. 13 is a diagram of aberrations of the zoom lens according to Example 3 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 9 shows basic lens data in a state in which the extender lens group Ex of the zoom lens of Example 3 is not inserted, and Table 10 shows specifications and variable surface distances. Table 11 shows the basic lens data of the zoom lens of Example 3 after the extender lens group Ex is inserted, and Table 12 shows specifications and variable surface distances. Tables 9 to 12 are tables in a state where the object at infinity is in focus. FIG. 13 shows a diagram of aberrations of the zoom lens of Example 3 in a state in which the extender lens group Ex is not inserted and an object at an object distance of 50 m is in focus.

TABLE 9

Example 3

| Si | Ri | Di | Ndj | vdj |
|---|---|---|---|---|
| 1 | 186.7505 | 3.00 | 1.53996 | 59.46 |
| 2 | 134.6542 | 15.27 | 1.49700 | 81.54 |
| 3 | −698.1398 | 0.18 | | |
| 4 | 167.7369 | 5.07 | 1.83481 | 42.74 |
| 5 | 93.5908 | 12.73 | 1.43875 | 94.66 |
| 6 | 426.1841 | 9.76 | | |
| 7 | 92.6006 | 18.63 | 1.43875 | 94.66 |
| 8 | −308.9753 | 2.00 | 1.48749 | 70.24 |
| 9 | 254.8848 | DD [9] | | |
| 10 | 214.7822 | 1.90 | 1.72916 | 54.09 |
| 11 | 58.3356 | 13.47 | | |
| 12 | 155.1103 | 1.33 | 1.74400 | 44.79 |
| 13 | 107.7589 | 5.56 | | |
| 14 | 1358.1287 | 1.40 | 1.72916 | 54.68 |
| 15 | 19.9208 | 5.01 | 1.80518 | 25.42 |
| 16 | 43.3179 | 3.20 | | |
| 17 | −50.5184 | 2.99 | 1.80518 | 25.42 |
| 18 | −21.1475 | 1.20 | 1.80400 | 46.53 |
| 19 | 129.0276 | DD [19] | | |
| 20 | 77.2332 | 4.39 | 1.49700 | 81.54 |
| 21 | −95.5727 | 0.12 | | |
| 22 | 80.0668 | 2.07 | 1.95375 | 32.32 |
| 23 | 39.3170 | 5.30 | 1.43875 | 94.66 |
| 24 | −171.6957 | 0.12 | | |
| 25 | 80.9011 | 2.30 | 1.43875 | 94.66 |
| 26 | 1758.4933 | 0.26 | | |
| 27 | 72.2752 | 4.14 | 1.51633 | 64.14 |
| 28 | 121.2152 | DD [28] | | |
| 29 (St) | ∞ | 0.95 | | |
| 30 | 88.8228 | 1.87 | 1.83481 | 42.74 |
| 31 | 20.9569 | 6.85 | 1.51742 | 52.43 |
| 32 | −26.2174 | 1.20 | 1.51633 | 64.14 |
| 33 | −1355.5219 | 3.99 | | |
| 34 | −123.8903 | 0.80 | 1.51633 | 64.14 |
| 35 | 47.5074 | 0.12 | | |
| 36 | 18.6921 | 3.16 | 1.66680 | 33.05 |
| 37 | 1738.7591 | 0.70 | | |
| 38 | −74.3028 | 0.80 | 1.83481 | 42.74 |
| 39 | 28.0156 | 30.00 | | |
| 40 | 33.5685 | 2.94 | 1.63980 | 34.47 |
| 41 | −46.7474 | 0.12 | | |
| 42 | 28.7543 | 3.07 | 1.49700 | 81.54 |
| 43 | −34.2546 | 0.80 | 1.72916 | 54.09 |
| 44 | 35.0772 | 0.96 | | |
| 45 | 58.6376 | 1.20 | 1.81600 | 46.62 |
| 46 | 37.4928 | 3.43 | | |
| 47 | ∞ | 1.00 | 1.51680 | 64.20 |
| 48 | ∞ | 5.66 | | |
| 49 | 106.0277 | 1.20 | 1.89190 | 37.13 |
| 50 | 12.3650 | 3.91 | 1.49700 | 81.54 |
| 51 | −25.1860 | 5.00 | | |
| 52 | ∞ | 1.00 | 1.51633 | 64.05 |
| 53 | ∞ | 22.96 | | |

TABLE 10

Example 3

|    | WIDE   | MIDDLE | TELE    |
|----|--------|--------|---------|
| Zr | 1.0    | 9.4    | 88.0    |
| f  | 14.48  | 135.83 | 1274.17 |
| Bf | 28.62  | 28.62  | 28.62   |
| FNo. | 3.62 | 4.02   | 11.94   |
| 2ω (°) | 33.0 | 3.8  | 0.4     |
| DD [9] | 0.89 | 74.39 | 93.60  |
| DD [19] | 166.55 | 70.58 | 0.53 |
| DD [28] | 3.22 | 25.68 | 76.53  |

TABLE 11

Example 3 After Insertion of Extender Lens Group

| Si | Ri | Di | Ndj | vdj |
|----|-----|-----|------|------|
| 1 | 186.7505 | 3.00 | 1.53996 | 59.46 |
| 2 | 134.6542 | 15.27 | 1.49700 | 81.54 |
| 3 | −698.1398 | 0.18 | | |
| 4 | 167.7369 | 5.07 | 1.83481 | 42.74 |
| 5 | 93.5908 | 12.73 | 1.43875 | 94.66 |
| 6 | 426.1841 | 9.76 | | |
| 7 | 92.6006 | 18.63 | 1.43875 | 94.66 |
| 8 | −308.9753 | 2.00 | 1.48749 | 70.24 |
| 9 | 254.8848 | DD [9] | | |
| 10 | 214.7822 | 1.90 | 1.72916 | 54.09 |
| 11 | 58.3356 | 13.47 | | |
| 12 | 155.1103 | 1.33 | 1.74400 | 44.79 |
| 13 | 107.7589 | 5.56 | | |
| 14 | 1358.1287 | 1.40 | 1.72916 | 54.68 |
| 15 | 19.9208 | 5.01 | 1.80518 | 25.42 |
| 16 | 43.3179 | 3.20 | | |
| 17 | −50.5184 | 2.99 | 1.80518 | 25.42 |
| 18 | −21.1475 | 1.20 | 1.80400 | 46.53 |
| 19 | 129.0276 | DD [19] | | |
| 20 | 77.2332 | 4.39 | 1.49700 | 81.54 |
| 21 | −95.5727 | 0.12 | | |
| 22 | 80.0668 | 2.07 | 1.95375 | 32.32 |
| 23 | 39.3170 | 5.30 | 1.43875 | 94.66 |
| 24 | −171.6957 | 0.12 | | |
| 25 | 80.9011 | 2.30 | 1.43875 | 94.66 |
| 26 | 1758.4933 | 0.26 | | |
| 27 | 72.2752 | 4.14 | 1.51633 | 64.14 |
| 28 | 121.2152 | DD [28] | | |
| 29 (St) | ∞ | 0.95 | | |
| 30 | 88.8228 | 1.87 | 1.83481 | 42.74 |
| 31 | 20.9569 | 6.85 | 1.51742 | 52.43 |
| 32 | −26.2174 | 1.20 | 1.51633 | 64.14 |
| 33 | −1355.5219 | 3.99 | | |
| 34 | −123.8903 | 0.80 | 1.51633 | 64.14 |
| 35 | 47.5074 | 0.12 | | |
| 36 | 18.6921 | 3.16 | 1.66680 | 33.05 |
| 37 | 1738.7591 | 0.70 | | |
| 38 | −74.3028 | 0.80 | 1.83481 | 42.74 |
| 39 | 28.0156 | 3.00 | | |
| 40 | 15.9843 | 3.63 | 1.49700 | 81.54 |
| 41 | −142.6407 | 0.12 | | |
| 42 | 17.5192 | 2.74 | 1.95375 | 32.32 |
| 43 | −332.3257 | 0.60 | 1.80518 | 25.42 |
| 44 | 14.0909 | 5.68 | | |
| 45 | −24.3121 | 1.20 | 1.80400 | 46.53 |
| 46 | 15.2088 | 1.99 | 1.49700 | 81.54 |
| 47 | 13.3772 | 1.80 | | |
| 48 | 32.1145 | 2.04 | 1.89286 | 20.36 |
| 49 | −14.8428 | 1.20 | 2.00330 | 28.27 |
| 50 | 90.1111 | 6.00 | | |
| 51 | 33.5685 | 2.94 | 1.63980 | 34.47 |
| 52 | −46.7474 | 0.12 | | |
| 53 | 28.7543 | 3.07 | 1.49700 | 81.54 |
| 54 | −34.2546 | 0.80 | 1.72916 | 54.09 |
| 55 | 35.0772 | 0.96 | | |
| 56 | 58.6376 | 1.20 | 1.81600 | 46.62 |
| 57 | 37.4928 | 3.43 | | |
| 58 | ∞ | 1.00 | 1.51680 | 64.20 |
| 59 | ∞ | 5.66 | | |
| 60 | 106.0277 | 1.20 | 1.89190 | 37.13 |
| 61 | 12.3650 | 3.91 | 1.49700 | 81.54 |
| 62 | −25.1860 | 5.00 | | |
| 63 | ∞ | 1.00 | 1.51633 | 64.05 |
| 64 | ∞ | 23.22 | | |

TABLE 12

Example 3 After Insertion of Extender Lens Group

|    | WIDE   | MIDDLE | TELE    |
|----|--------|--------|---------|
| Zr | 1.0    | 9.4    | 88.0    |
| f  | 25.66  | 240.70 | 2257.95 |
| Bf | 33.02  | 33.02  | 33.02   |
| FNo. | 7.33 | 8.06   | 23.70   |
| 2ω (°) | 17.2 | 2.0  | 0.2     |
| DD [9] | 0.89 | 74.39 | 93.60  |
| DD [19] | 166.55 | 70.58 | 0.53 |
| DD [28] | 3.22 | 25.68 | 76.53  |

Example 4

Figure 9:
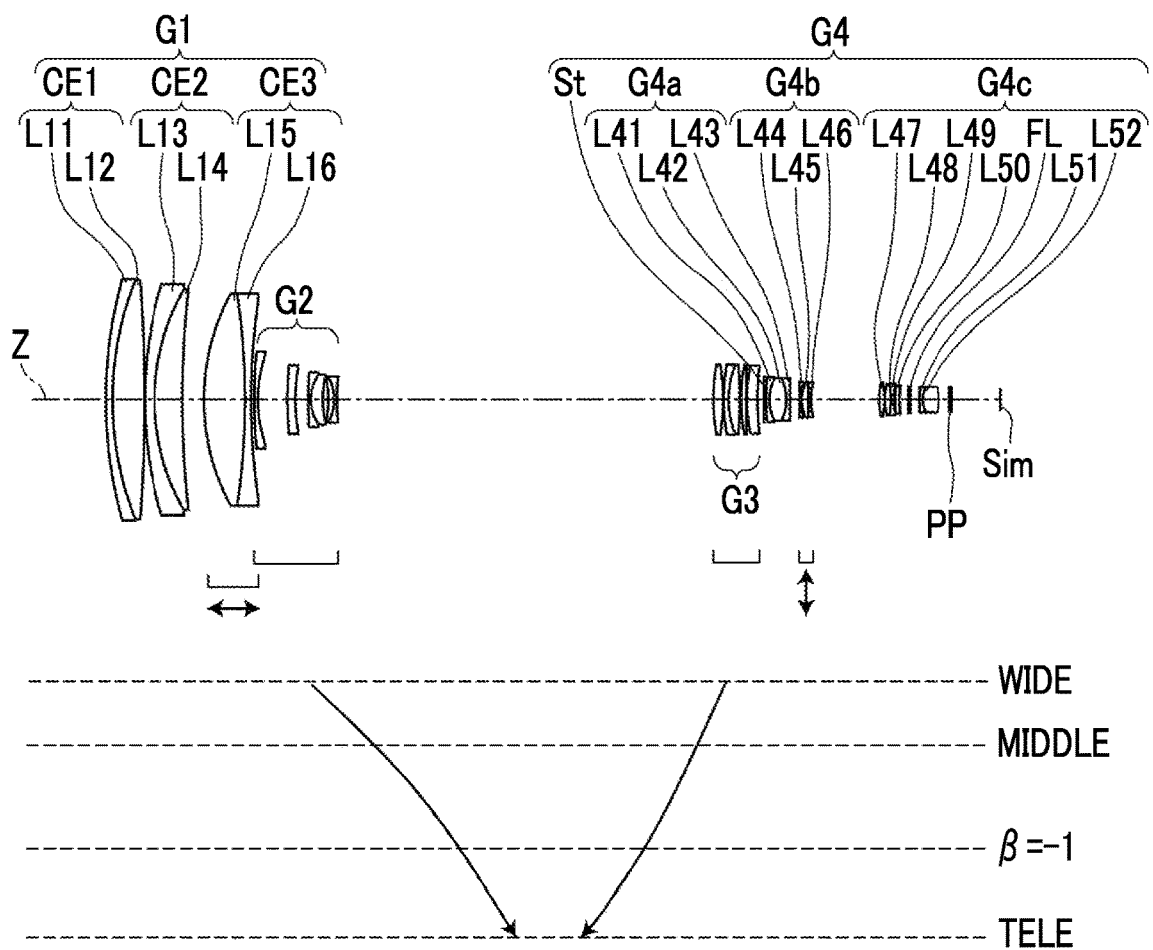
FIG. 9 is a cross-sectional view illustrating a configuration of a zoom lens according to Example 4 of the present invention at the wide-angle end and a movement locus thereof during zooming.
Figure 10:
FIG. 10 is a cross-sectional view of the zoom lens in a state in which an extender lens group is inserted in the zoom lens of FIG. 9.

FIG. 9 shows a cross-sectional view of a lens configuration in a state where the extender lens group Ex of the zoom lens of Example 4 is not inserted and a movement locus thereof. FIG. 10 shows a cross-sectional view of the zoom lens of Example 4 after the extender lens group Ex is inserted. FIGS. 9 and 10 show the zoom lens in a state in which the object at infinity is in focus. The schematic configuration of the zoom lens of Example 4 is the same as that of Example 1. The number of lenses composing each of the fourth-a lens group G4a, the fourth-b lens group G4b, and the fourth-c lens group G4c of the zoom lens of Example 4 is the same as that of Example 2.

Table 13 shows basic lens data in a state in which the extender lens group Ex of the zoom lens of Example 4 is not inserted, and Table 14 shows specifications and variable surface distances. Table 15 shows the basic lens data of the zoom lens of Example 4 after the extender lens group Ex is inserted, and Table 16 shows specifications and variable surface distances. Tables 13 to 16 are tables in a state where the object at infinity is in focus. In addition, in Tables 13 and 15, the reference sign * is attached to surface numbers of aspheric surfaces, and numerical values of the paraxial radius of curvature are written into the column of the radius of curvature of the aspheric surface. Table 17 shows aspheric coefficients of the aspheric surfaces. The "E±n" (n: an integer) in numerical values of the aspheric coefficients of Table 17 indicates "×10$^{±n}$". The aspheric coefficients are values of the coefficients KA and Am (m=3, 4, 5, . . . 20) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

TABLE 13

Example 4

| Si | Ri | Di | Ndj | vdj |
|---|---|---|---|---|
| 1 | 195.5767 | 3.05 | 1.51633 | 64.14 |
| 2 | 139.5867 | 14.65 | 1.49700 | 81.54 |
| 3 | −720.1754 | 0.17 | | |
| 4 | 171.5069 | 4.66 | 1.83481 | 42.74 |
| 5 | 95.0554 | 12.73 | 1.43875 | 94.66 |
| 6 | 416.5718 | 9.88 | | |
| 7 | 96.0628 | 18.74 | 1.43875 | 94.66 |
| 8 | −306.9249 | 2.74 | 1.48749 | 70.24 |
| 9 | 289.0839 | DD [9] | | |
| 10 | 208.4668 | 1.76 | 1.77250 | 49.60 |
| 11 | 61.7521 | 13.11 | | |
| *12 | 152.4701 | 3.69 | 1.74320 | 49.29 |
| 13 | 82.0306 | 5.91 | | |
| 14 | 391.4734 | 1.24 | 1.72916 | 54.09 |
| 15 | 19.1486 | 5.50 | 1.80518 | 25.42 |
| 16 | 44.7289 | 2.48 | | |
| 17 | −50.1960 | 2.66 | 1.80518 | 25.42 |
| 18 | −20.5540 | 1.27 | 1.80400 | 46.53 |
| 19 | 102.5169 | DD [19] | | |
| 20 | 78.5397 | 4.51 | 1.49700 | 81.54 |
| *21 | −88.9792 | 0.25 | | |
| 22 | 86.0332 | 2.25 | 1.95375 | 32.32 |
| 23 | 40.2290 | 5.14 | 1.43875 | 94.66 |
| 24 | −180.3181 | 0.49 | | |
| 25 | 77.8421 | 2.49 | 1.43875 | 94.66 |
| 26 | −5712.2468 | 0.16 | | |
| 27 | 69.1743 | 4.82 | 1.51633 | 64.14 |
| 28 | 116.4111 | DD [28] | | |
| 29 (St) | ∞ | 0.95 | | |
| 30 | 95.7319 | 1.47 | 1.81600 | 46.62 |
| 31 | 20.1185 | 7.88 | 1.51742 | 52.43 |
| 32 | −20.8734 | 1.71 | 1.51633 | 64.14 |
| 33 | 8768.0559 | 4.33 | | |
| 34 | −138.9571 | 0.85 | 1.48749 | 70.24 |
| 35 | 43.7015 | 0.12 | | |
| 36 | 17.6892 | 2.90 | 1.62588 | 35.70 |
| 37 | 1652.3241 | 0.50 | | |
| 38 | −65.4585 | 0.85 | 1.83481 | 42.74 |
| 39 | 29.2849 | 30.76 | | |
| 40 | 33.0265 | 2.49 | 1.63980 | 34.47 |
| 41 | −43.1444 | 0.12 | | |
| 42 | 28.4290 | 2.82 | 1.49700 | 81.54 |
| 43 | −33.0668 | 1.35 | 1.72916 | 54.09 |
| 44 | 34.7155 | 0.60 | | |
| 45 | 74.8704 | 1.94 | 1.80400 | 46.53 |
| 46 | 46.4096 | 3.97 | | |
| 47 | ∞ | 1.00 | 1.51680 | 64.20 |
| 48 | ∞ | 4.13 | | |
| 49 | 152.0966 | 1.46 | 1.89190 | 37.13 |
| 50 | 11.3501 | 7.56 | 1.49700 | 81.54 |
| 51 | −22.2860 | 5.00 | | |
| 52 | ∞ | 1.00 | 1.51633 | 64.05 |
| 53 | ∞ | 22.29 | | |

TABLE 14

Example 4

| | WIDE | MIDDLE | TELE |
|---|---|---|---|
| Zr | 1.0 | 10.0 | 100.0 |
| f | 13.74 | 137.44 | 1374.40 |
| Bf | 27.95 | 27.95 | 27.95 |
| FNo. | 3.69 | 4.07 | 12.88 |
| 2ω (°) | 34.4 | 3.8 | 0.4 |

TABLE 14-continued

Example 4

| | WIDE | MIDDLE | TELE |
|---|---|---|---|
| DD [9] | 1.41 | 78.67 | 98.10 |
| DD [19] | 170.98 | 71.53 | 1.03 |
| DD [28] | 3.05 | 25.25 | 76.32 |

TABLE 15

Example 4 After Insertion of Extender Lens Group

| Si | Ri | Di | Ndj | vdj |
|---|---|---|---|---|
| 1 | 195.5767 | 3.05 | 1.51633 | 64.14 |
| 2 | 139.5867 | 14.65 | 1.49700 | 81.54 |
| 3 | −720.1754 | 0.17 | | |
| 4 | 171.5069 | 4.66 | 1.83481 | 42.74 |
| 5 | 95.0554 | 12.73 | 1.43875 | 94.66 |
| 6 | 416.5718 | 9.88 | | |
| 7 | 96.0628 | 18.74 | 1.43875 | 94.66 |
| 8 | −306.9249 | 2.74 | 1.48749 | 70.24 |
| 9 | 289.0839 | DD [9] | | |
| 10 | 208.4668 | 1.76 | 1.77250 | 49.60 |
| 11 | 61.7521 | 13.11 | | |
| *12 | 152.4701 | 3.69 | 1.74320 | 49.29 |
| 13 | 82.0306 | 5.91 | | |
| 14 | 391.4734 | 1.24 | 1.72916 | 54.09 |
| 15 | 19.1486 | 5.50 | 1.80518 | 25.42 |
| 16 | 44.7289 | 2.48 | | |
| 17 | −50.1960 | 2.66 | 1.80518 | 25.42 |
| 18 | −20.5540 | 1.27 | 1.80400 | 46.53 |
| 19 | 102.5169 | DD [19] | | |
| 20 | 78.5397 | 4.51 | 1.49700 | 81.54 |
| *21 | −88.9792 | 0.25 | | |
| 22 | 86.0332 | 2.25 | 1.95375 | 32.32 |
| 23 | 40.2290 | 5.14 | 1.43875 | 94.66 |
| 24 | −180.3181 | 0.49 | | |
| 25 | 77.8421 | 2.49 | 1.43875 | 94.66 |
| 26 | −5712.2468 | 0.16 | | |
| 27 | 69.1743 | 4.82 | 1.51633 | 64.14 |
| 28 | 116.4111 | DD [28] | | |
| 29 (St) | ∞ | 0.95 | | |
| 30 | 95.7319 | 1.47 | 1.81600 | 46.62 |
| 31 | 20.1185 | 7.88 | 1.51742 | 52.43 |
| 32 | −20.8734 | 1.71 | 1.51633 | 64.14 |
| 33 | 8768.0559 | 4.33 | | |
| 34 | −138.9571 | 0.85 | 1.48749 | 70.24 |
| 35 | 43.7015 | 0.12 | | |
| 36 | 17.6892 | 2.90 | 1.62588 | 35.70 |
| 37 | 1652.3241 | 0.50 | | |
| 38 | −65.4585 | 0.85 | 1.83481 | 42.74 |
| 39 | 29.2849 | 3.00 | | |
| 40 | 34.7714 | 2.25 | 1.49700 | 81.54 |
| 41 | −105.6973 | 0.12 | | |
| 42 | 18.9690 | 3.46 | 1.95375 | 32.32 |
| 43 | −35.9969 | 1.93 | 1.80518 | 25.42 |
| 44 | 16.7325 | 6.10 | | |
| 45 | −67.2316 | 1.20 | 1.80400 | 46.53 |
| 46 | 66.2839 | 1.20 | 1.49700 | 81.54 |
| 47 | 13.8903 | 2.13 | | |
| 48 | 146.5298 | 2.17 | 1.89286 | 20.36 |
| 49 | −12.0647 | 1.20 | 2.00330 | 28.27 |
| 50 | 103.1282 | 6.00 | | |
| 51 | 33.0265 | 2.49 | 1.63980 | 34.47 |
| 52 | −43.1444 | 0.12 | | |
| 53 | 28.4290 | 2.82 | 1.49700 | 81.54 |
| 54 | −33.0668 | 1.35 | 1.72916 | 54.09 |
| 55 | 34.7155 | 0.60 | | |
| 56 | 74.8704 | 1.94 | 1.80400 | 46.53 |
| 57 | 46.4096 | 3.97 | | |
| 58 | ∞ | 1.00 | 1.51680 | 64.20 |
| 59 | ∞ | 4.13 | | |

TABLE 15-continued

Example 4 After Insertion of Extender Lens Group

| Si | Ri | Di | Ndj | vdj |
|---|---|---|---|---|
| 60 | 152.0966 | 1.46 | 1.89190 | 37.13 |
| 61 | 11.3501 | 7.56 | 1.49700 | 81.54 |
| 62 | −22.2860 | 5.00 | | |
| 63 | ∞ | 1.00 | 1.51633 | 64.05 |
| 64 | ∞ | 22.35 | | |

TABLE 16

Example 4 After Insertion of Extender Lens Group

| | WIDE | MIDDLE | TELE |
|---|---|---|---|
| Zr | 1.0 | 10.0 | 100.0 |
| f | 22.09 | 220.90 | 2209.04 |
| Bf | 29.24 | 29.24 | 29.24 |
| FNo. | 7.37 | 8.14 | 25.01 |
| 2ω (°) | 18.2 | 2.0 | 0.2 |
| DD [9] | 1.41 | 78.67 | 98.10 |
| DD [19] | 170.98 | 71.53 | 1.03 |
| DD [28] | 3.05 | 25.25 | 76.32 |

TABLE 17

Example 4

| | Surface Number | |
|---|---|---|
| | 12 | 21 |
| KA | 1.0000000E+00 | 1.0000000E+00 |
| A3 | 0.0000000E+00 | 4.1633363E−21 |
| A4 | 4.7790123E−07 | −8.4037455E−07 |
| A5 | −1.3812512E−07 | 2.6250808E−07 |
| A6 | 2.4678936E−09 | −1.1009805E−08 |
| A7 | 3.1603311E−09 | −4.2663286E−09 |
| A8 | −1.8070625E−10 | 4.0709855E−10 |
| A9 | −2.9300333E−11 | 2.7006418E−11 |
| A10 | 2.1108302E−12 | −3.8745172E−12 |
| A11 | 1.4458394E−13 | −8.1418547E−14 |
| A12 | −1.1349408E−14 | 1.8610257E−14 |
| A13 | −4.1179648E−16 | 1.0670067E−16 |
| A14 | 3.3081291E−17 | −5.1319122E−17 |
| A15 | 6.8049537E−19 | −7.1527693E−22 |
| A16 | −5.3975132E−20 | 8.2365617E−20 |
| A17 | −6.0661290E−22 | −1.3137136E−22 |
| A18 | 4.6423896E−23 | −7.1580543E−23 |
| A19 | 2.2572407E−25 | 8.9919117E−26 |
| A20 | −1.6408710E−26 | 2.6042989E−26 |

Figure 14:
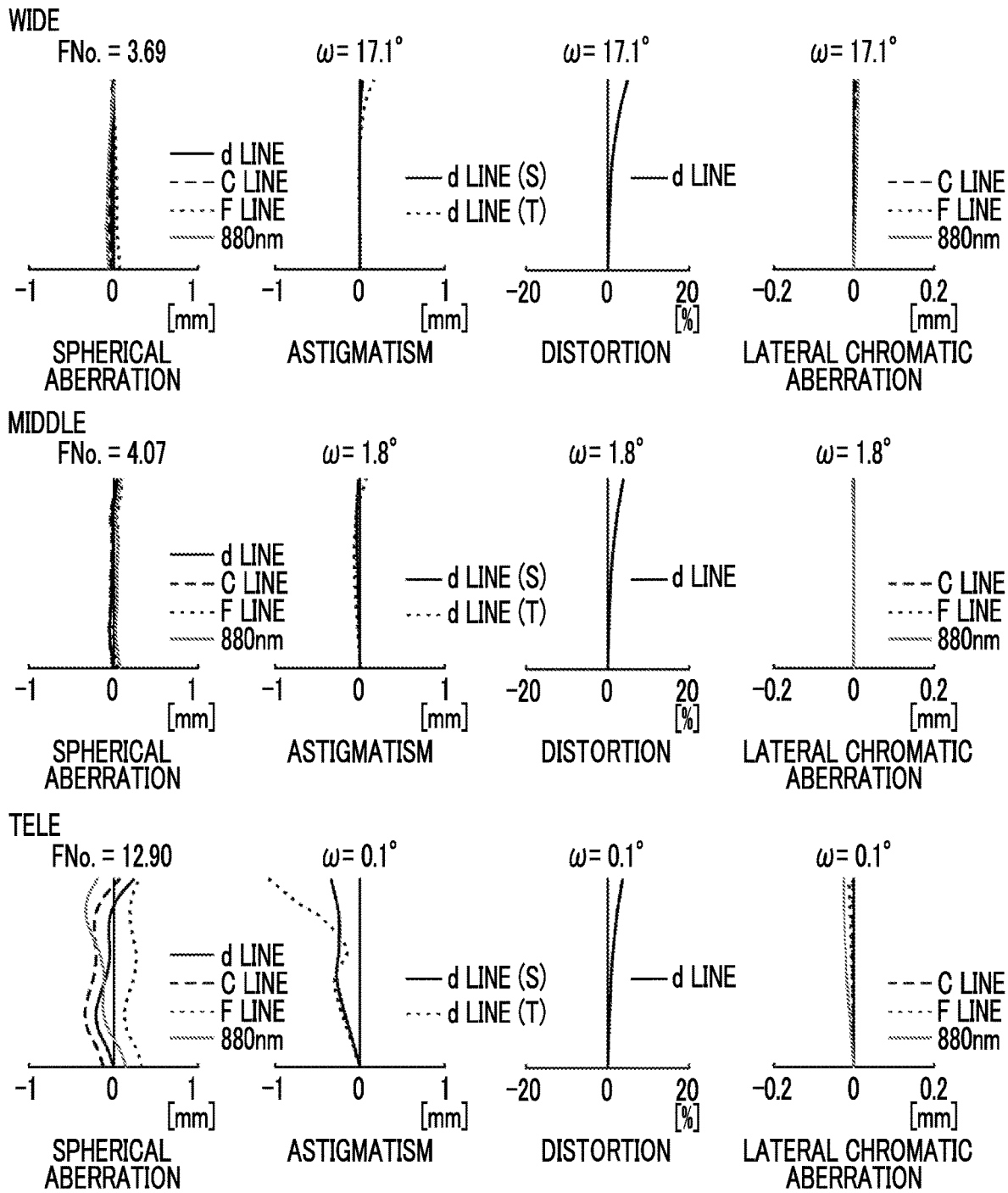
FIG. 14 is a diagram of aberrations of the zoom lens according to Example 4 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 14 shows a diagram of aberrations of the zoom lens of Example 4 in a state in which the extender lens group Ex is not inserted and an object at an object distance of 50 m is in focus.

Table 18 shows values corresponding to Conditional Expressions (1) to (4) of the zoom lenses of Examples 1 to 4. The values shown in Table 18 are based on the d line.

TABLE 18

| Expression Number | | Example 1 | Example 2 | Example 3 | Example 4 |
|---|---|---|---|---|---|
| (1) | f2/ft | −0.015 | −0.015 | −0.013 | −0.012 |
| (2) | vavep − vaven | 29.2 | 32.8 | 32.8 | 36.8 |
| (3) | f4a/f4b | 5.94 | 3.76 | 3.57 | 3.04 |
| (4) | ΔφFC × f1 | −0.00165 | −0.00127 | −0.00131 | −0.00135 |

As can be seen from the above-mentioned data, the zoom lenses of Examples 1 to 4 each have a high zoom ratio which is a zoom ratio of 80 times even in a state where the extender lens group Ex is not inserted. Thereby, various aberrations in the visible to near-infrared wavelength bands are satisfactorily corrected. As a result, high optical performance is achieved.

Figure 15:
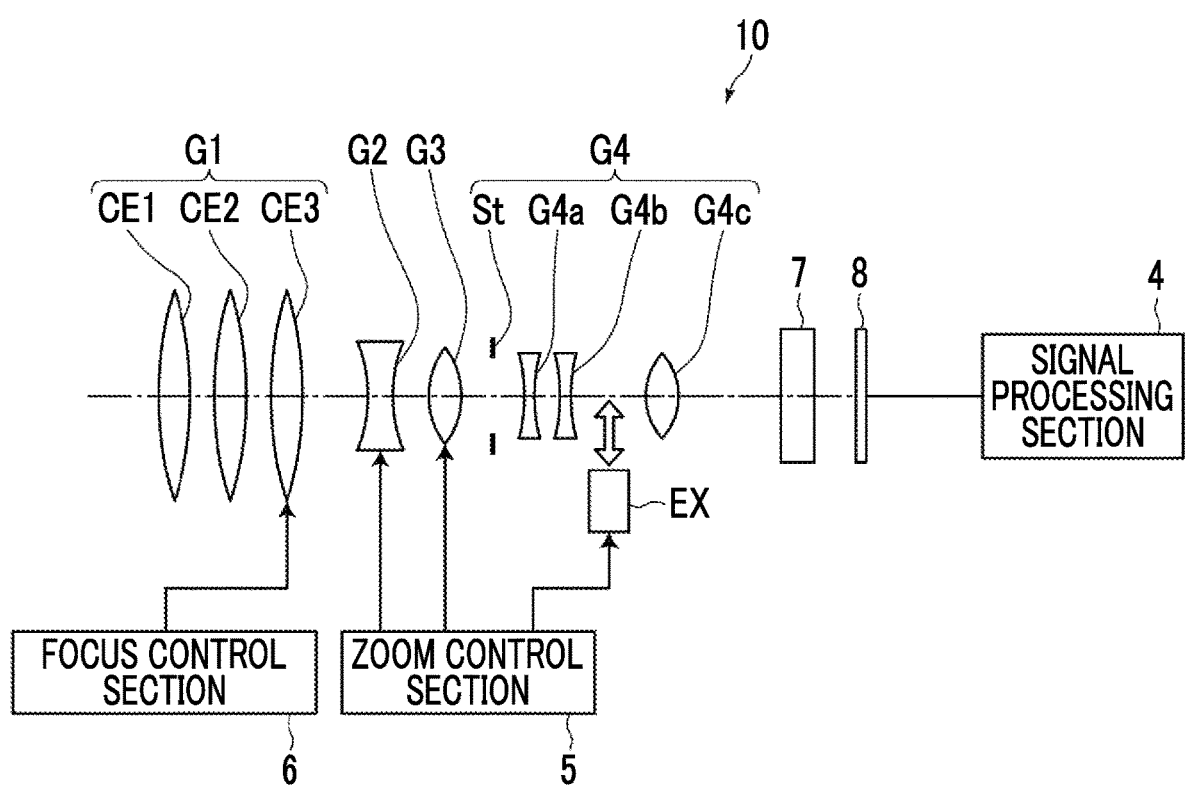
FIG. 15 is a schematic configuration diagram of an imaging apparatus according to an embodiment of the present invention.

Next, an imaging apparatus according to an embodiment of the present invention will be described. FIG. 15 is a schematic configuration diagram of an imaging apparatus 10 using the zoom lens according to the embodiment of the present invention as an example of an imaging apparatus of an embodiment of the present invention. As the imaging apparatus 10, for example, there is a surveillance camera, a video camera, an electronic still camera, or the like.

The imaging apparatus 10 comprises a zoom lens; a filter 7 that is disposed on the image side of the zoom lens; an imaging element 8 that captures an image of a subject formed through the zoom lens; a signal processing section 4 that calculates an output signal from the imaging element 8; a zoom control section 5 that is for performing zooming of the zoom lens; and a focus control section 6 that is for focusing of the zoom lens. It should be noted that, in FIG. 15, each lens group is schematically illustrated. The imaging element 8 captures the image of the subject formed through the zoom lens, converts the image into an electrical signal, and is disposed such that the imaging surface thereof is coplanar with the image plane of the zoom lens. As the imaging element 8, for example, it is possible to use a charge coupled device (CCD), a complementary metal oxide semiconductor (CMOS), or the like.

It should be noted that FIG. 15 shows only one imaging element 8, but the imaging apparatus of the present invention is not limited to this, and may be a so-called three-plate imaging device having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric coefficient of each lens are not limited to the values shown in the numerical examples, and different values may be used therefor.

What is claimed is:

1. A zoom lens comprising, in order from an object side:
a first lens group that has a positive refractive power;
a second lens group that has a negative refractive power;
a third lens group that has a positive refractive power; and
a fourth lens group that has a positive refractive power and has a stop disposed to be closest to the object side,
wherein during zooming from the wide-angle end to the telephoto end, the first lens group and the fourth lens group remain stationary with respect to an image plane, the second lens group and the third lens group move in a direction of an optical axis by changing a relative distance therebetween, and the second lens group and the third lens group simultaneously pass points at which respective lateral magnifications thereof are −1 times,
wherein the first lens group consists of, in order from the object side, a first cemented lens that is formed by cementing a negative meniscus lens and a positive lens in order from the object side, a second cemented lens that is formed by cementing a negative meniscus lens and a positive lens in order from the object side, and a third cemented lens that is formed by cementing a positive lens and a negative lens in order from the object side, and wherein during focusing from an object at infinity to a close-range object, only the third cemented lens moves.

2. The zoom lens according to claim 1, wherein assuming that a focal length of the second lens group is f2 and a focal length of the whole system at the telephoto end during focusing on the object at infinity is ft, Conditional Expression (1) is satisfied.

$$-0.019 < f2/ft < -0.008 \quad (1)$$

3. The zoom lens according to claim 1, wherein assuming that an average value of Abbe numbers of all the positive lenses in the first lens group at a d line is vavep and an average value of Abbe numbers of all the negative lenses in the first lens group at the d line is vaven, Conditional Expression (2) is satisfied.

$$24 < vavep - vaven < 41 \quad (2)$$

4. The zoom lens according to claim 1, wherein the fourth lens group comprises a fourth-a lens group that has a negative refractive power and includes one negative lens and one positive lens, a fourth-b lens group that has a negative refractive power and is disposed on the image side of the fourth-a lens group, and a fourth-c lens group that has a positive refractive power and is disposed on the image side of the fourth-b lens group so as to be separated from the fourth-b lens group by an air gap which is longest on the optical axis in the fourth lens group, wherein blurring in a captured image is corrected by moving only the fourth-b lens group in a direction perpendicular to the optical axis, wherein assuming that a focal length of the fourth-a lens group is f4a and a focal length of the fourth-b lens group is f4b, Conditional Expression (3) is satisfied.

$$2.4 < f4a/f4b < 6.6 \quad (3)$$

5. The zoom lens according to claim 4, wherein an extender lens group is detachably disposed to change a focal length of the whole system to a long focal length by being inserted in the optical path between the fourth-b lens group and the fourth-c lens group.

6. The zoom lens according to claim 1, wherein assuming that a refractive index of the positive lens of the third cemented lens at a d line is Ndp, a refractive index of the negative lens of the third cemented lens at the d line is Ndn, an Abbe number of the positive lens of the third cemented lens at the d line is vdp, an Abbe number of the negative lens of the third cemented lens at the d line is vdn, a radius of curvature of a cemented surface of the third cemented lens is Rc, $\Delta\Phi FC = ((Ndn-1)/vdn - (Ndp-1)/vdp)/Rc$, and a focal length of the first lens group is f1, Conditional Expression (4) is satisfied.

$$-0.002 < \Delta\Phi FC \times f1 < -0.001 \quad (4)$$

7. The zoom lens according to claim 2, wherein Conditional Expression (1-1) is satisfied.

$$-0.017 < f2/ft < -0.01 \quad (1\text{-}1)$$

8. The zoom lens according to claim 3, wherein Conditional Expression (2-1) is satisfied.

$$27 < vavep - vaven < 38 \quad (2\text{-}1)$$

9. The zoom lens according to claim 4, wherein Conditional Expression (3-1) is satisfied.

$$2.8 < f4a/f4b < 6.2 \quad (3\text{-}1)$$

10. The zoom lens according to claim 6, wherein Conditional Expression (4-1) is satisfied.

$$-0.0018 < \Delta\Phi FC \times f1 < -0.0012 \quad (4\text{-}1)$$

11. An imaging apparatus comprising the zoom lens according to claim 1.

* * * * *